US006845238B1

(12) United States Patent
Müller

(10) Patent No.: US 6,845,238 B1
(45) Date of Patent: Jan. 18, 2005

(54) INTER-FREQUENCY MEASUREMENT AND HANDOVER FOR WIRELESS COMMUNICATIONS

(75) Inventor: Walter G. A. Müller, Uplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/545,872

(22) Filed: Apr. 6, 2000

Related U.S. Application Data

(60) Provisional application No. 60/154,577, filed on Sep. 17, 1999, provisional application No. 60/153,946, filed on Sep. 15, 1999, and provisional application No. 60/153,947, filed on Sep. 15, 1999.

(51) Int. Cl.$^7$ ................................................. H04Q 7/20
(52) U.S. Cl. ....................... 455/436; 455/437; 455/442; 455/450; 370/331
(58) Field of Search ................................. 455/436, 437, 455/438, 442, 443, 444; 370/331, 464, 450, 555.1, 553.1

(56) References Cited

U.S. PATENT DOCUMENTS 5,063,494 A   11/1991   Davidowski et al.

(List continued on next page.)

FOREIGN PATENT DOCUMENTS

EP        0 888 026 A2   12/1998

(List continued on next page.)

OTHER PUBLICATIONS

U.S. Appl. No. 09/314,019, filed May 19, 1999, entitled "Mobile Station Measurements With Event–Based Reporting".

(List continued on next page.)

*Primary Examiner*—William Trost
*Assistant Examiner*—Stephen M. D'Agosta
(74) *Attorney, Agent, or Firm*—Nixon & Vanderhye, P.C.

(57) ABSTRACT

A telecommunications network performs an inter-frequency hard handover for a connection with a user equipment unit (UE) by switching either from a cell or a current active set of base stations on a first frequency to a virtual active set of base stations on another (new) frequency. The inter-frequency hard handover can be an inter-frequency handover within a same system, or an inter-system handover. The virtual active set of base stations is maintained at the user equipment unit (UE), and is updated in accordance with one of several updating implementations of the invention. In a first mode of the invention for implementing virtual active set updates, the network authorizes the user equipment unit (UE) to report to the network the occurrence of certain network-specified events which are acted upon by the network for communicating virtual active set update information to the user equipment unit (UE). In a second mode of the invention, the network authorizes the user equipment unit (UE) to perform an autonomous virtual active set update upon occurrence of certain network-specified events, with inter-frequency events being reported from the equipment unit (UE) to the network and the network issuing an inter-frequency handover command. Advantageously, events which trigger intra-frequency measurements can be reused for reporting inter-frequency measurements. In another of its aspects, the present invention provides the network with a quality estimate for a current active set as well as a quality estimate for the virtual active set. The quality estimate can be utilized in a context of a handover from one UTRAN frequency to another UTRAN frequency, or even in the context of an inter-system handover (e.g., a handover between a UTRAN system and a GSM system, for example). The quality estimate can be utilized to trigger a change or switch of frequencies/systems. Certain thresholds employed in the quality estimate-utilizing handovers provide hysteresis protection.

51 Claims, 19 Drawing Sheets

U.S. PATENT DOCUMENTS

| | | | |
|---|---|---|---|
| 5,164,938 A | | 11/1992 | Jurkevich et al. |
| 5,267,261 A | | 11/1993 | Blakeney, II et al. |
| 5,379,404 A | | 1/1995 | Rasor |
| 5,457,780 A | | 10/1995 | Shaw et al. |
| 5,483,668 A | * | 1/1996 | Malkamaki et al. ........ 370/331 |
| 5,594,718 A | | 1/1997 | Weaver, Jr. et al. |
| 5,613,203 A | * | 3/1997 | Dupuy et al. ............... 370/337 |
| 5,697,055 A | | 12/1997 | Gilhousen et al. |
| 5,706,290 A | | 1/1998 | Shaw et al. |
| 5,715,419 A | | 2/1998 | Szczepanek et al. |
| 5,740,239 A | | 4/1998 | Bhagat et al. |
| 5,767,833 A | | 6/1998 | Vanderwiele et al. |
| 5,774,465 A | | 6/1998 | Lau et al. |
| 5,825,774 A | | 10/1998 | Ready et al. |
| 5,826,017 A | | 10/1998 | Holzmann |
| 5,838,226 A | | 11/1998 | Houggy et al. |
| 5,848,063 A | * | 12/1998 | Weaver et al. .............. 370/331 |
| 5,903,832 A | | 5/1999 | Seppanen et al. |
| 5,920,549 A | * | 7/1999 | Bruckert et al. ............ 370/331 |
| 5,995,836 A | * | 11/1999 | Wijk et al. .................. 455/436 |
| 5,999,816 A | * | 12/1999 | Tiedemann et al. ......... 455/437 |
| 6,002,940 A | | 12/1999 | Richter |
| 6,006,077 A | | 12/1999 | Shull |
| 6,078,570 A | * | 6/2000 | Czaja et al. ................ 370/331 |
| 6,097,954 A | * | 8/2000 | Kumar et al. ............... 455/442 |
| 6,111,864 A | | 8/2000 | Kabasawa |
| 6,181,943 B1 | * | 1/2001 | Kuo et al. ................... 455/437 |
| 6,285,883 B1 | * | 9/2001 | Bringby et al. ............. 370/331 |
| 6,301,478 B1 | * | 10/2001 | Wallstedt et al. ........... 455/436 |
| 6,304,755 B1 | * | 10/2001 | Tiedemann et al. ......... 455/437 |
| 6,590,879 B1 | * | 7/2003 | Huang et al. ............... 370/331 |

FOREIGN PATENT DOCUMENTS

| | | |
|---|---|---|
| EP | 0 946 076 A | 9/1999 |
| EP | 0 948 231 A | 10/1999 |
| FR | 2 790 632 A | 9/2000 |
| JP | 10-155173 A | 6/1998 |
| WO | 98/51103 | 11/1998 |
| WO | 00/36867 | 6/2000 |
| WO | 00/41429 | 7/2000 |
| WO | 01/26409 A1 | 4/2001 |

OTHER PUBLICATIONS

U.S. Appl. No. 09/344,122, filed Jun. 24, 1999, entitled "Network–Evaluated Handover Assisted By Both Mobile and Base–Stations".

U.S. Appl. No. 09/344,121, filed Jun. 24, 1999, entitled "Power Control Based On Combined Quality Estimates".

U.S. Appl. No. 09/262,346, filed Mar. 4, 1999, entitled "Coordinating Different Types of Messages Sent To Mobile Radios In A Mobile Communications System".

Technical Specification, $3^{rd}$ Generation Partnership Project: Technical Specification Group Radio Access Network: RRC Protocol Specification (Release 1999), 3G TS 25.331 V3, 2.0 (2000–03).

Technical Specification, $3^{rd}$ Generation Partnership Project (3GPP); Technical Specification Group (TSG) RAN; Working Group 2 (WG2); RRC Protocol Specification, TS 25.331, V3.0.0 (1999–10).

Technical Specification, $3^{rd}$ Generation Partnership Projection; Technical Specification Group Radio Access Network; RRC Protocol Specification (3G TS 25.331), version 3.1.0 release, 1999.

* cited by examiner

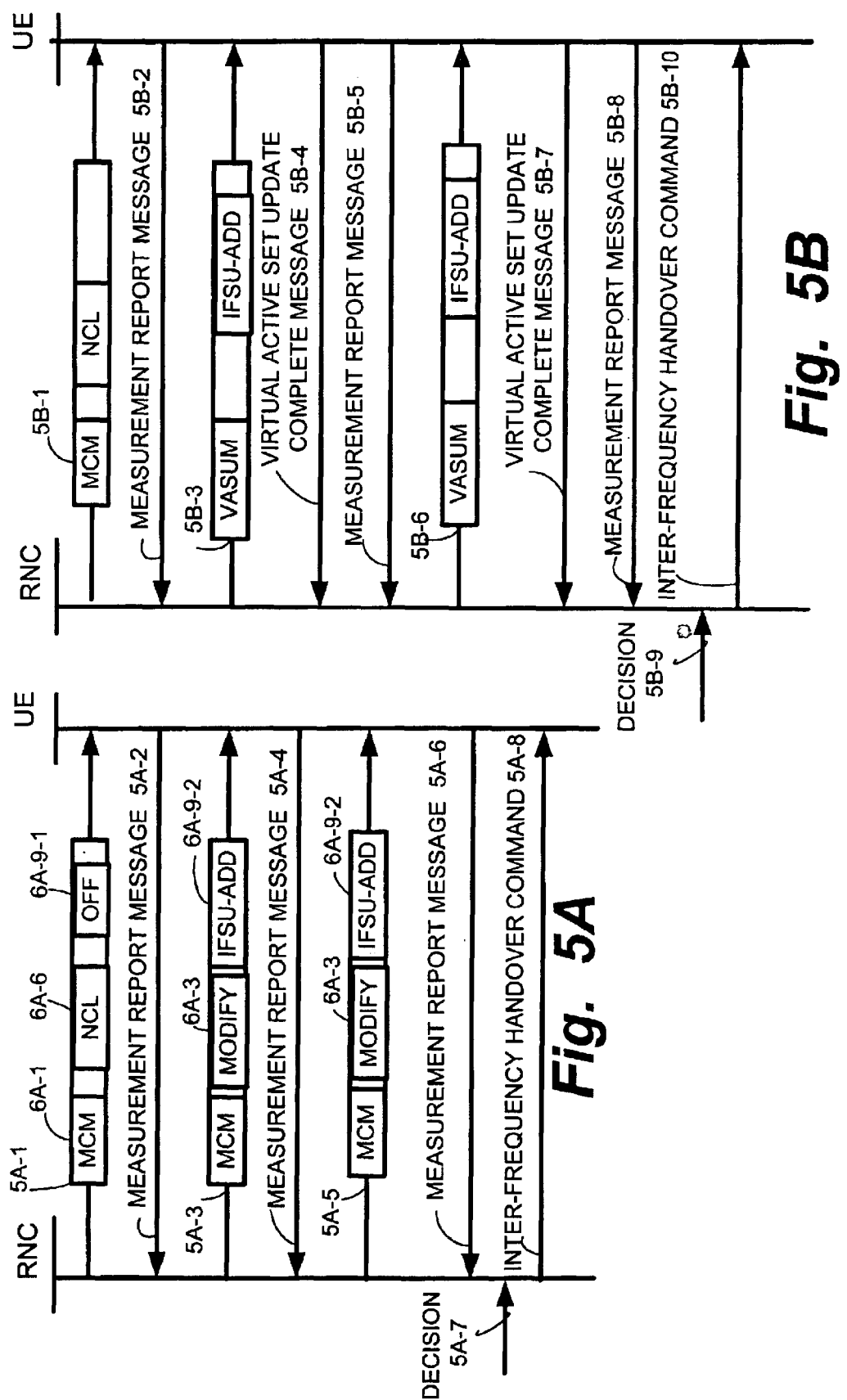

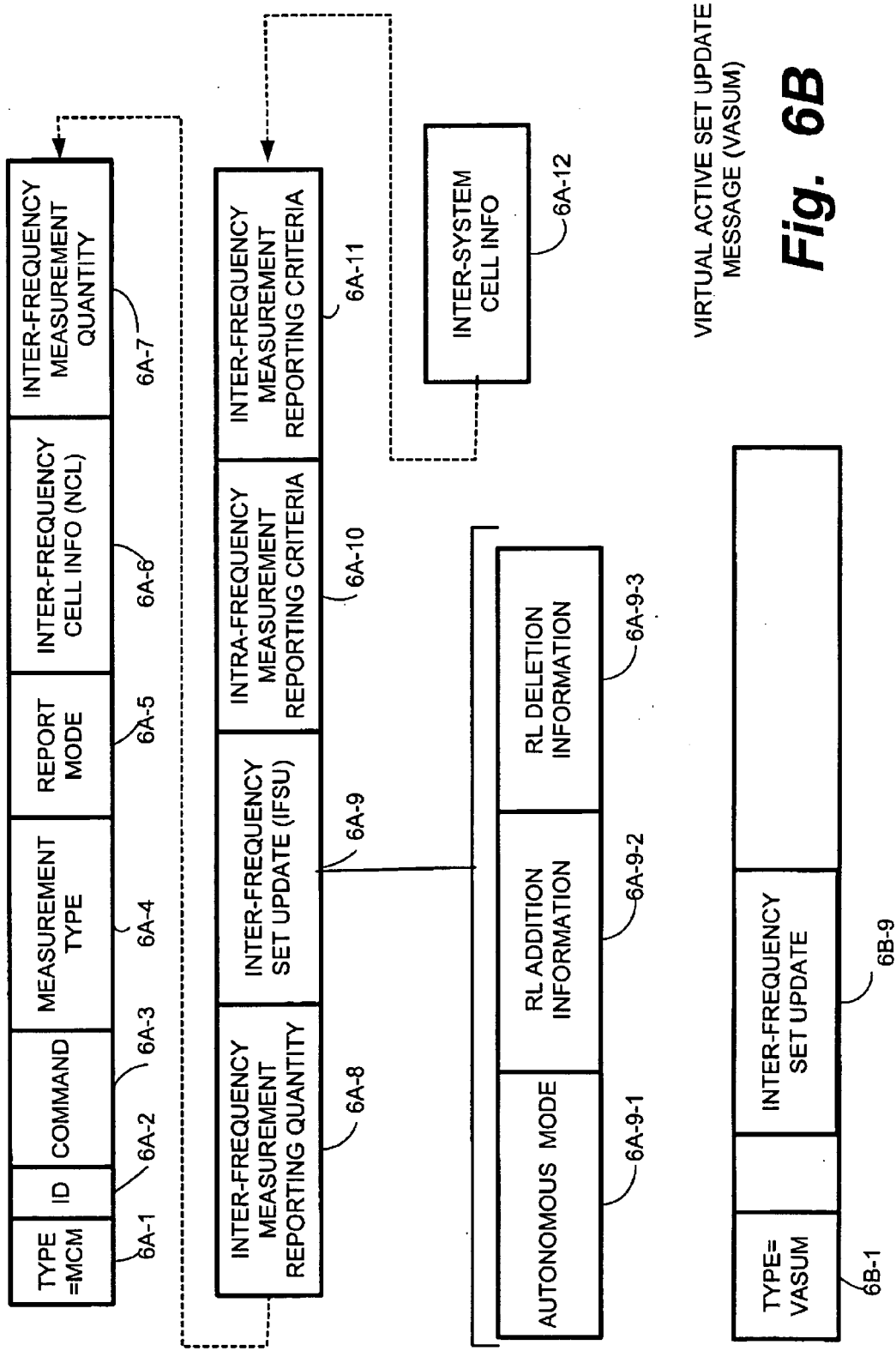

ID
INTER-FREQUENCY MEASUREMENT AND HANDOVER FOR WIRELESS COMMUNICATIONS

This application claims the benefit and priority of the following U.S. Provisional Patent Applications, all of which are incorporated herein by reference: U.S. Provisional Patent Application Ser. No. 60/154,577 filed Sep. 17, 1999; U.S. Provisional Patent Application Ser. No. 60/153,946 filed Sep. 15, 1999; U.S. Provisional Patent Application Ser. No. 60/153,947 filed Sep. 15, 1999.

BACKGROUND

1. Field of the Invention

The field of the invention is wireless communications. The present invention pertains to inter-frequency handover and inter-frequency measurement reporting.

2. Related Art and Other Considerations

In a typical cellular radio system, a geographical area is divided into cell areas served by base stations which are connected to a radio network. Each user (mobile subscriber) in the cellular radio system is provided with a portable, pocket, hand-held, or car-mounted mobile station (user equipment unit or UE) which communicates voice and/or data with the mobile radio network. Each base station includes a plurality of channel units including a transmitter, a receiver, and a controller and may be equipped with an omnidirectional antenna for transmitting equally in all directions or with directional antennas, each directional antenna serving a particular sector cell. Each user equipment unit (UE) also includes a transmitter, a receiver, a controller, and a user interface and is identified by a specific user equipment unit (UE) identifier.

In a cellular radio communications system, a handover operation allows an established radio connection to continue when a mobile radio participating in that connection moves between cells in the system. Handover is typically initiated when the signal strength or signal quality of the radio connection with an origination base station falls below a predetermined threshold value. Often, a low signal strength or a poor signal quality indication means that the user equipment unit (UE) is near a border between the two cells. If the user equipment unit (UE) moves closer to a destination cell or to a clearer line of unobstructed sight, handover of the radio connection to the destination cell usually results in improved radio transmission and reception.

In some cellular systems, a handover operation requires physically breaking the connection with the origination cell and then reestablishing the connection with the destination cell, i.e., a "break-before-make" switching operation. Such hard handover techniques are typically employed in Time Division Multiple Access (TDMA) and Frequency Division Multiple Access (FDMA) type cellular systems.

On the other hand, "soft" handover techniques may be employed in Code Division Multiple Access (CDMA) type cellular systems. CDMA is an increasingly popular type of access for cellular communications because a higher spectrum efficiency is achieved compared to FDMA and TDMA techniques which means that more cellular users and/or services can be supported. In addition, a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal.

In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

Deciding which cells to involve in handover often requires coordination between the user equipment unit (UE) and the radio network. For example, in Wideband CDMA (WCDMA), the user equipment unit (UE) maintains a list of cells to monitor for potential handover purposes. The list of cells maintained by the user equipment unit (UE) includes cells comprising an "active list", as well as adjacent cells which (although not in the active list) are to be monitored. The user equipment unit (UE) continuously updates its list of cells to monitor based on information communicated to the user equipment unit (UE) by the network. For example, the network may provide, via a message such as a measurement control message, an initial list of cells via a message such as a measurement control message. The initial list of cells may be, for example, a list of cells which neighbor the cell in which the user equipment unit (UE) is located. Thereafter the network may update the user equipment unit (UE) regarding what cells should be included in the active set using a message such as an active set update message.

The user equipment unit (UE) monitors, e.g., makes measurements regarding, the base station control or broadcast channel of each of the cells included in the list maintained by the user equipment unit (UE). The monitoring results (e.g., measurements) are transmitted to the network where, based on this monitoring, the network makes a determination as to what cells should be in the active set (e.g., what cells should be added, replaced, or removed).

As indicated above, in CDMA a user equipment unit (UE) need not necessarily switch frequency when handoff of a connection is made from one cell to another. Moreover, at any given moment, the user equipment unit (UE) may be in radio contact over the same radio frequency with plural base stations, i.e., the "active set" of base stations/cells for the user equipment unit (UE). This type of soft hand-over described above (pertaining to the use of the same frequency) is also known as a intra-frequency soft handover or active set update procedure.

In order to know how to perform an intra-frequency soft handover, measurements must be performed relative to certain control channels transmitted, e.g., from the base stations in the active set and from adjacent cells. The properties of a general control channel used for measurements are that the control channel have fixed power and be monitorable by the user equipment unit (UE) over the anticipated coverage area of the cell, allowing an extra margin for delays in user equipment unit (UE) detection and reporting. The measurements can be, for example, certain signal strength or signal to noise ratio (e.g., signal to interference ratio) measurements for the control channels. The values of the measurements of the control channels from the base stations are compared, with the results of the comparison being utilized to determine how the handover is to be performed (e.g., which cells to include or exclude from the active set).

In the soft handover context, the control channels transmitted from the base stations in the active set and adjacent cells, and which are measured for purposes of the handover, are distinguishable from one another despite being on the same frequency. In one particular CDMA context, the control channel utilized for the handover measurements is a physical control channel known as a common pilot channel (CPICH), formerly referred to as a primary common control physical channel (P CCPCH). Typically, in connection with the different cells for handover, the user equipment unit (UE) measures the CPICH of the cells that should be monitored (e.g., those for the base stations in the active set). The CPICH can be regarded as the equivalent to what is commonly called the pilot, or perch, channel for other systems.

Thus, as alluded to above, employment of measurements (e.g., of the CPICH) for the purpose of handover typically involves some type of measurement reporting, e.g., a reporting of measurements from the user equipment unit (UE), for example. Topics such as reporting criteria and reporting events for such measurements, the maintenance of an active set of base stations supported by event driven measurement reporting from the user equipment unit (UE), as well as handover in general, are described e.g., in one or more of the following (all of which are incorporated herein by reference in their entirety):

(1) U.S. Pat. No. 6,445,917, entitled "Mobile Station Measurements With Event-Based Reporting";

(2) U.S. patent application Ser. No. 09/344,122, filed Jun. 24, 1999, entitled "Network-Evaluated Handover Assisted By Both Mobile and Base-Stations";

(3) U.S. Pat. No. 6.490.461, entitled "Power Control Based On Combined Quality Estimates";

(4) U.S. Pat. No. 6.438.375, entitled "Coordinating Different Types of Messages Sent To Mobile Radios In A Mobile Communications System".

In addition, background information may be provided by one or more of the following United States patents, all of which are incorporated herein by reference: U.S. Pat. No. 5,594,718; U.S. Pat. No. 5,697,055; U.S. Pat. No. 5,267,261; U.S. Pat. No. 5,848,063.

While intra-frequency soft handover is an advantageous feature of CDMA, there are occasions when a user equipment unit (UE) needs to switch to a new frequency. The changing or switching of a connection involving a user equipment unit (UE) from one frequency to another is known as an inter-frequency handover. Due to limitations of the user equipment unit (UE), a "soft" inter-frequency handover is essentially impossible, or at the very best very difficult, to achieve. Therefore, the inter-frequency handover typically must be a hard handover. Such being the case, it is highly desirable that the telecommunications network allocate the appropriate cells for the active set on the new frequency as quickly as possible. In order to do so, however, the network needs relevant measurement information on the new frequency from the user equipment unit (UE). But obtaining the relevant measurement information on the new frequency from the user equipment unit (UE) after the inter-frequency handover is executed is time-consuming, and works against the objective of allocating the active set on the new frequency as quickly as possible.

What is needed, therefore, and an object of the present invention, is a technique, for facilitating rapid inter-frequency handover.

BRIEF SUMMARY OF THE INVENTION

A telecommunications network performs an inter-frequency hard handover for a connection with a user equipment unit (UE) by switching from either a cell or a current active set of base stations on a first frequency to a virtual active set of base stations on another (new) frequency. The handover can be an inter-frequency handover within a same system, or an inter-system handover.

In accordance with the present invention, the virtual active set of base stations (along with the active set of base stations) is maintained at the user equipment unit (UE). The virtual active set of base stations is updated in accordance with one of several updating implementations of the invention. When a measurement report from the user equipment unit (UE) to the network warrants, the network issues an inter-frequency handover command to the user equipment unit (UE), so that the user equipment unit (UE) then uses the new frequency of the virtual active set rather than the first frequency.

In a first mode of the invention for implementing virtual active set updates, the network authorizes the user equipment unit (UE) to report to the network the occurrence of certain network-specified events. The network acts on these reports as necessary by communicating virtual active set update information to the user equipment unit (UE). In the first mode of the invention for implementing virtual active set updates, prior to actual inter-frequency handover, i.e., when the user equipment unit (UE) is operating on a current frequency with respect to an active set of base stations, the telecommunications network updates the virtual active set of base stations maintained by the user equipment unit (UE) for one or more non-used (e.g., prospective) frequencies. Two example techniques for sending a virtual active set update to the user equipment unit (UE) in accordance with the first mode are described. In the first example technique, a measurement control procedure with a measurement control message is utilized with the virtual active set update information in the inter-frequency information. In the second example technique, an active set update procedure including frequency information (e.g., the unused or prospective frequency) is sent from the network to the user equipment unit (UE).

In a second mode of the invention for implementing virtual active set updates, the network authorizes the user equipment unit (UE) to perform autonomous virtual active set updates. Such authorization can occur by the network specifying events that should trigger a virtual active set update (instead of having the user equipment unit (UE) send a measurement report to the network and wait for a measurement control order that contains a virtual active set update). Advantageously, the second mode reduces signaling. In the second mode, the user equipment unit (UE) can either send or not send reports (for the purpose, e.g., of confirming the autonomous virtual active set updating) to the network upon the occurrence of the certain network-specified events which triggered the autonomous virtual active set updating.

Prior to inter-frequency handover, the user equipment unit (LTE) continues to perform and report its intra-frequency soft handover measurements with respect to the current frequency for the current active set. Advantageously, in accordance with the present invention, events which trigger the intra-frequency measurements are reused for reporting inter-frequency measurements and, at the same time, support the maintenance of the virtual active set on the non-used frequency(ies). Thus, the reporting criteria needed for maintenance of the virtual active set on the new frequency is the same as currently defined for intra-frequency soft handover measurements. Using the inter-frequency measurements the network can make an inter-frequency handover decision and establish communication to the user equipment unit (UE) using a new and optimal active set as fast as possible after the inter-frequency handover is performed.

In another of its aspects, the present invention provides the network with a quality estimate for a current active set as well as a quality estimate for the virtual active set. The quality estimate can be utilized in a context of a handover from one UTRAN frequency to another UTRAN frequency, or even in the context of an inter-system handover (e.g., a handover between a UTRAN system and a GSM system, for example). The quality estimate can be utilized to trigger a change or switch of frequencies/systems. For UTRAN frequencies, the UTRAN frequency quality estimate is expressed by an Equation. The quality estimate of a GSM cell, on the other hand, is mainly based on two factors: (1) the measurement of the GSM carrier Radio Signal Strength Indication (RSSI); and (2) whether the Base Transceiver Station Identity Code, Base Station Identifier Code (BSIC) has been confirmed or not. Certain thresholds employed in the quality estimate-utilizing handovers provide hysteresis protection.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5A is a diagrammatic view illustrating a measurement control message procedure for the mode of FIG. 4.

FIG. 5B is a diagrammatic view illustrating an active set update procedure for the mode of FIG. 4.

FIG. 6A is a diagrammatic view showing selected information elements included in a measurement control message.

FIG. 6B is a diagrammatic view showing selected information elements included in a virtual active set update message.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
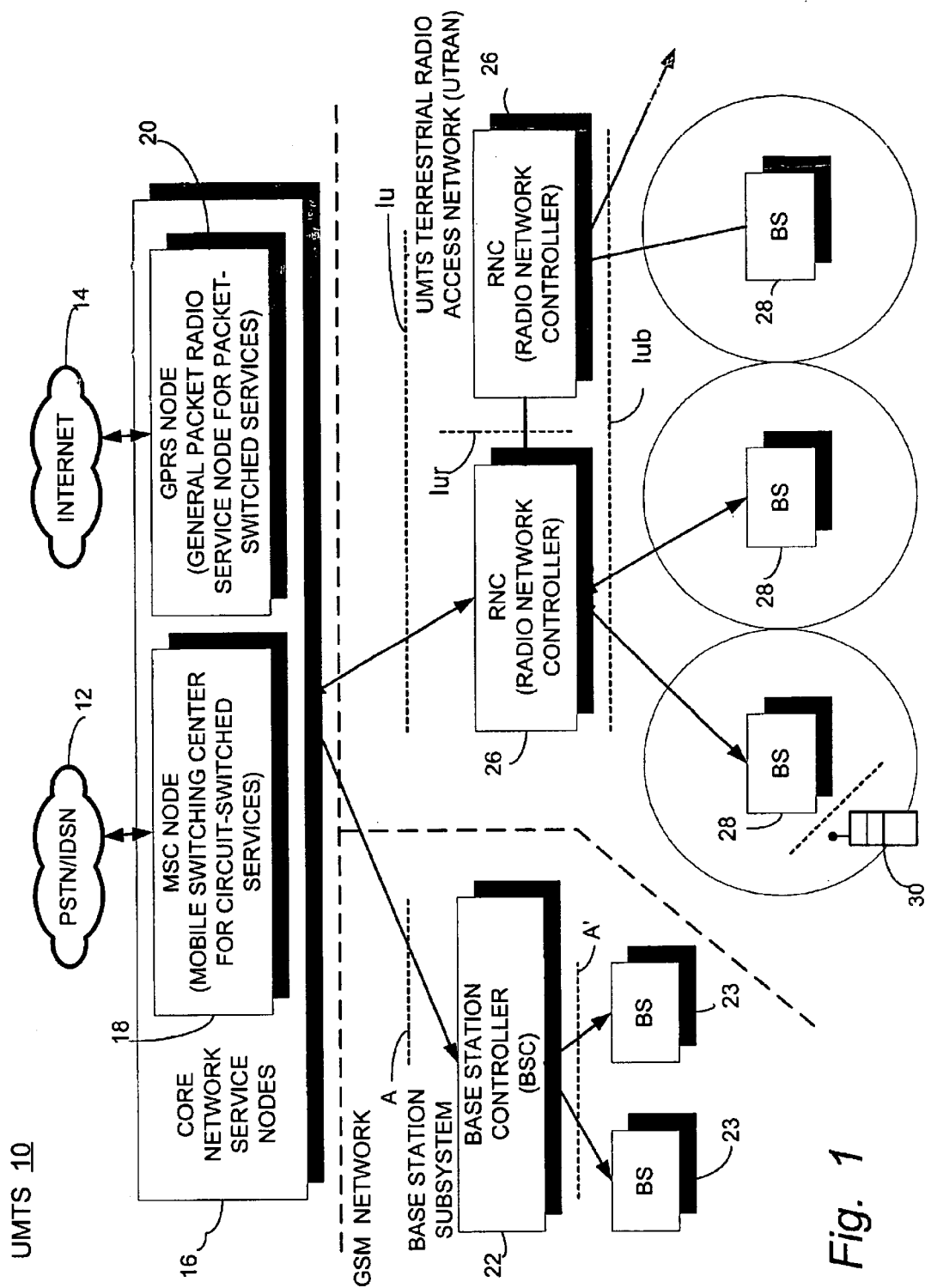
FIG. 1 is diagram of example mobile communications system in which the present invention may be advantageously employed.

The present invention is described in the non-limiting, example context of a universal mobile telecommunications (UMTS) 10 shown in FIG. 1. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

An existing GSM (Global System for Mobile communications) network includes a base station system (BSS). The base station system (BSS) comprises at least one (and preferably plural) base station controllers (BSC) 22, with each base station controller serving at least one (and preferably plural) base stations (BS) 23. Each base station controller (BSC) 22, only one of which is illustrated in FIG. 1, is connected to MSC 18 over an interface A. The base station controller (BSC) 22 is connected to its radio base stations 23 over interface A.

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers 26. Each RNC 26 is connected to a plurality of base stations (BS) 28 and to any other RNCs in the URAN 24.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Different types of control channels may exist between one of the base stations 28 and user equipment units (UEs) 30. For example, in the forward or downlink direction, there are several types of broadcast channels including a general broadcast channel (BCH), a paging channel (PCH), a common pilot channel (CPICH), and a forward access channel (FACH) for providing various other types of control messages to user equipment units (UEs). In the reverse or uplink direction, a random access channel (RACH) is employed by user equipment units (UEs) whenever access is desired to perform location registration, call origination, page response, and other types of access operations. The random access channel (RACH) is also used for carrying certain user data, e.g., best effort packet data for, e.g., web browser applications. Traffic channels (TCH) may be allocated to carry substantive call communications with a user equipment unit (UE).

The common pilot channel (CPICH) need not carry explicit data. Rather the code and physical appearance of the common pilot channel (CPICH) provide the user equipment unit (UE) with information. For example, the user equipment unit (UE) uses the common pilot channel (CPICH) for handover evaluation measurements or to get a good channel estimate to adjust the receiver optimally for other physical channels transmitted for that cell.

As shown in FIG. 1, some user equipment units (UEs) may communicate with only one base station. However, a user equipment unit (UE) may be communicating with plural base stations or plural base station sectors, e.g., soft handover. Even when idle, user equipment units (UEs) monitor or scan the control channel broadcasts from neighboring base stations.

Figure 2:
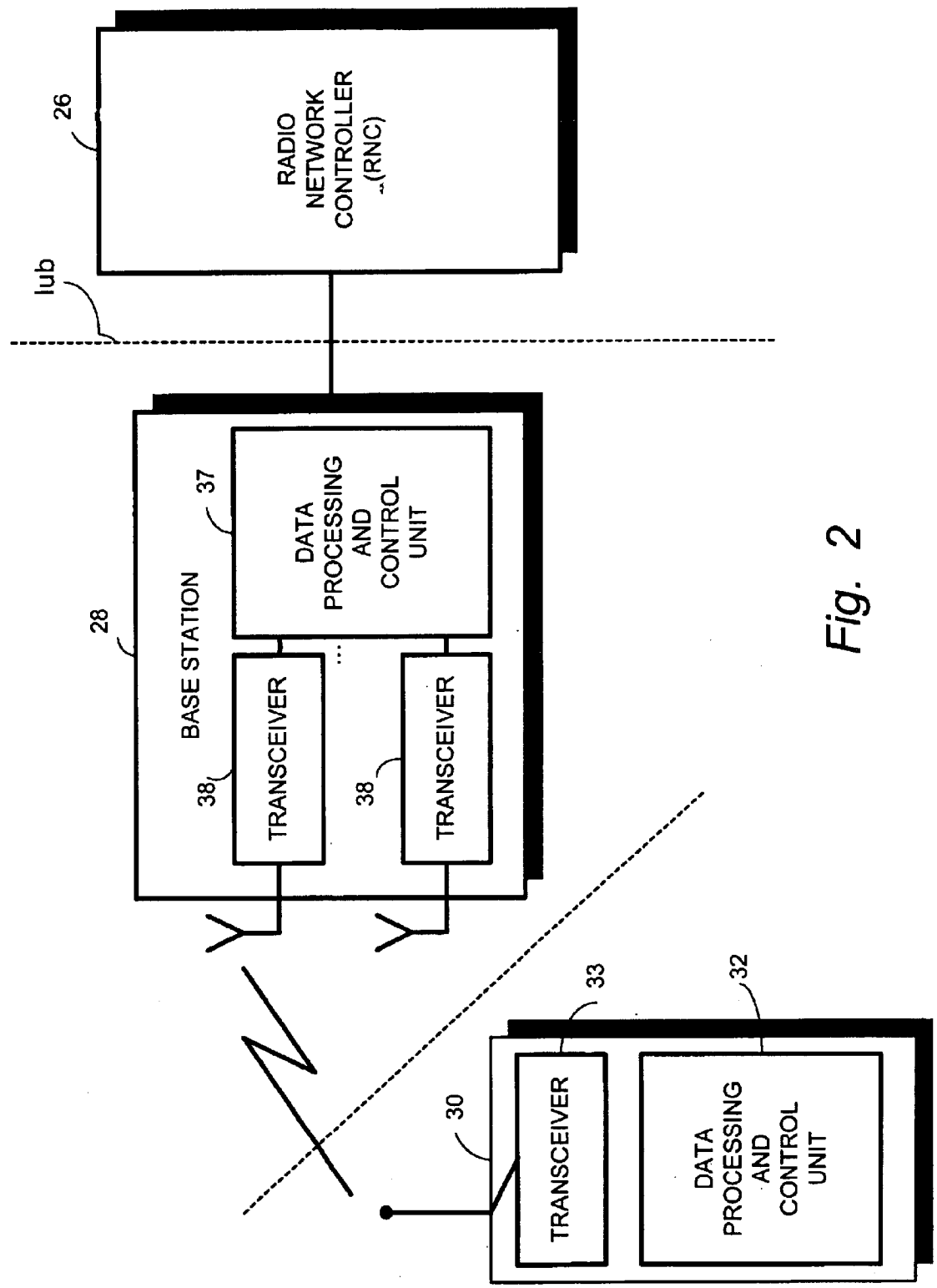
FIG. 2 is a simplified function block diagram of a portion of a UMTS Terrestrial Radio Access Network, including a user equipment unit (UE) station; a radio network controller; and a base station.

FIG. 2 shows selected general aspects of user equipment unit (UE) 30 and illustrative nodes such as radio network controller 26 and base station 28. The user equipment unit (UE) 30 shown in FIG. 2 includes a data processing and control unit 32 for controlling various operations required by the user equipment unit (UE). The UE's of data processing and control unit 32 provides control signals as well as data to a radio transceiver 33 connected to an antenna 35.

The example radio network controller 26 and base station 28 as shown in FIG. 2 are radio network nodes that each include a corresponding data processing and control unit 36 and 37, respectively, for performing numerous radio and data processing operations required to conduct communications between the RNC 26 and the user equipment units (UEs) 30. Part of the equipment controlled by the base station data processing and control unit 37 includes plural radio transceivers 38 connected to one or more antennas 39.

In the present invention, user equipment units (UEs) may be employed to provide measurement reports so that the UTRAN receives real-time knowledge of the network conditions based on one or more parameters measured by the user equipment units (UEs). It is preferable to get the relevant information in UTRAN with as little signaling as possible from each user equipment unit (UE). The sending of a measurement report may be and preferably is event triggered, as described (for example) in U.S. patent application Ser. No. 09/314,019, filed May 19, 1999, entitled "Mobile Station Measurements With Event-Based Reporting" (incorporated herein by reference).

Consequently, real-time knowledge of network conditions can be selectively conveyed at relevant moments so the UTRAN can effectively respond without delay and without excessive signaling overhead. An adaptive set of predetermined "events" and/or predetermined "conditions" may be defined that trigger measurement reports to be sent from the user equipment unit (UE). Once the report is received, the UTRAN may then analyze the reported information and perform, if necessary, responsive or other desirable operations like handover, power control, operations and maintenance, network optimization, and other procedures.

Figure 3:
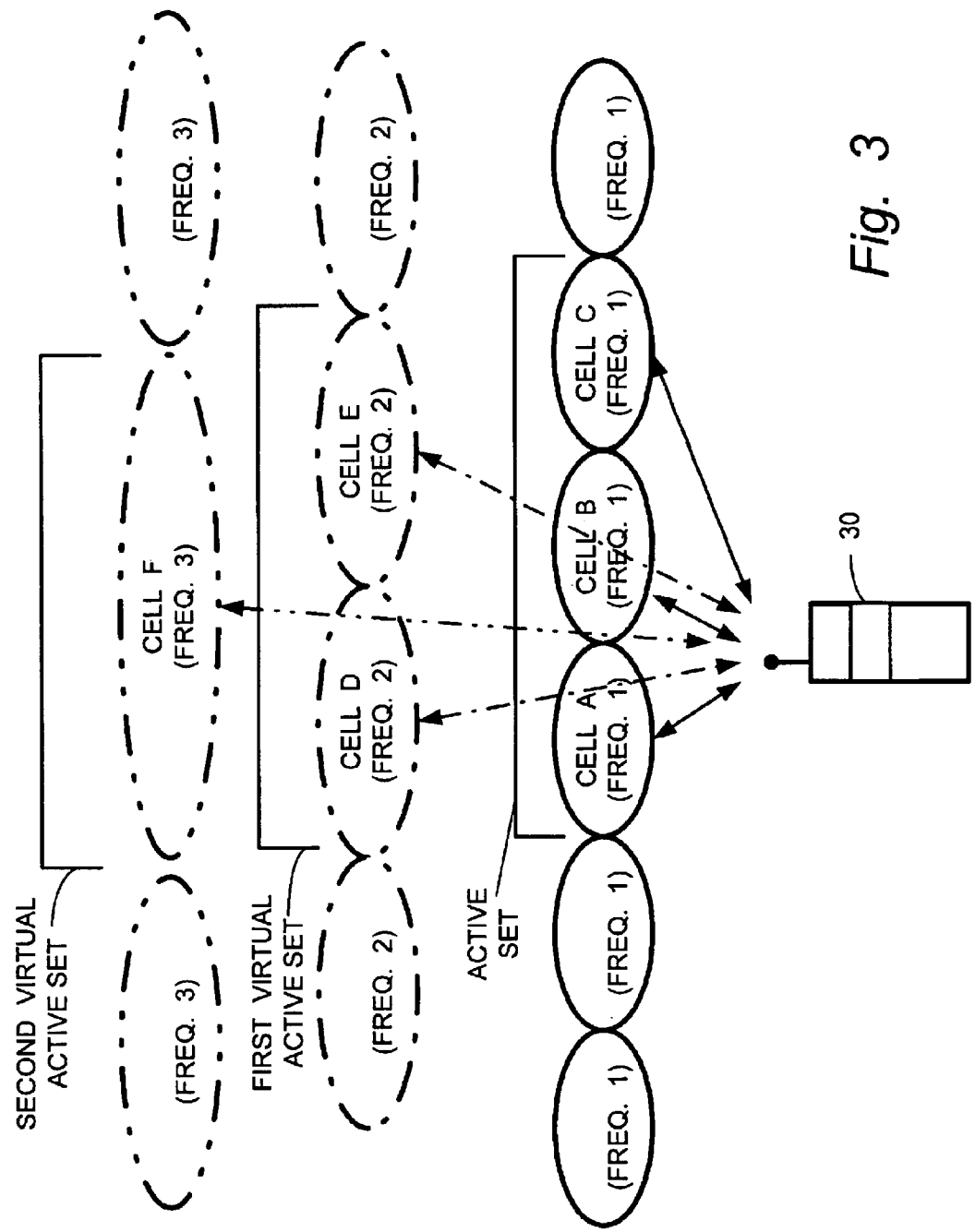
FIG. 3 is a diagrammatic view showing an active set and virtual active sets for a user equipment unit (UE) in accordance with one example scenario of the present invention.

As illustrated in FIG. 3, the user equipment unit (UE) 30 is tuned to an active set of base stations on a first frequency. As shown in FIG. 3, the active set comprises Cell A, Cell B, and Cell C, all utilizing Frequency 1. The user equipment unit (UE) 30 maintains a list of the cells included in the active set, which list is typically updated over time by the network (e.g., RNC 26) as user equipment unit (UE) travels or as other conditions change.

In the present invention, the user equipment unit (UE) 30 also maintains, along with the active set of base stations, one or more virtual active sets of base stations. In particular, FIG. 3 shows user equipment unit (UE) 30 as maintaining a first virtual active set comprising Cell D and Cell E (both on Frequency 2) and a second virtual active set comprising Cell F (on Frequency 3). The sets of Cells A–C, D–E, and F all cover approximately the same geographical area. Each set of cells operates at a different frequency. As explained later, one set of cells may be included in a system maintained by a first operator, while another of the sets of cells may be included in a system maintained by a second operator. Alternatively, one set of cells may be included in a network of a first technology type/generation (e.g., UTRAN), while another of the sets of cells may be included in a network of a second technology type/generation (e.g., IS-95, CDMA 2000, etc.).

Cells which belong to a virtual active set on a specific frequency (e.g., second or new frequency) are the cells that would be considered the active set on that specific frequency if the user equipment unit (UE) were tune to use that frequency. The user equipment unit (UE) provides measurements relative to both the active set and the virtual active set(s). Then, when measurements so warrant, the network issues an inter-frequency handover command to the user equipment unit (UE), so that the user equipment unit (UE) then uses the new frequency rather than the first frequency. That is, the telecommunications network performs an inter-frequency hard handover for a connection with user equipment unit (UE) 30 by switching from a current active set of base stations on a first frequency to the virtual active set of base stations on another (new) frequency.

In a first mode of the invention for implementing virtual active set updates, the network authorizes the user equipment unit (UE) to report to the network the occurrence of certain network-specified events. The network acts on these reports as necessary by communicating virtual active set update information to the user equipment unit (UE). Then, when a subsequent measurement report from the user equipment unit (UE) warrants, the network issues the inter-frequency handover command to the user equipment unit (UE).

Figure 4:
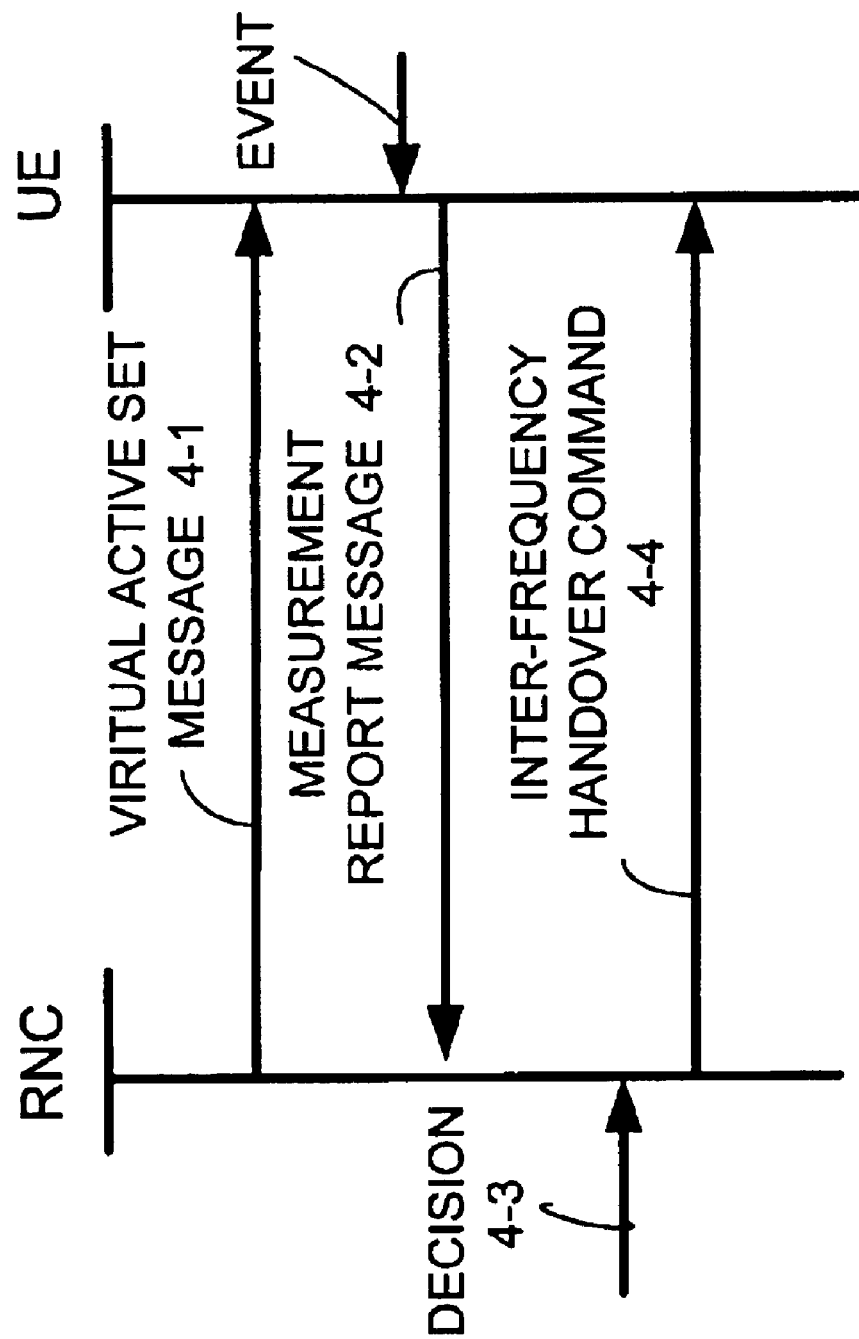
FIG. 4 is a diagrammatic view showing a sequence of basic actions involved in a first mode of the present invention for implementing virtual active set updates.

A sequence of basic steps involved in the first mode of the present invention is illustrated in FIG. 4. Prior to actual inter-frequency handover, i.e., when the user equipment unit (UE) 30 is operating on a current frequency with respect to an active set of base stations, telecommunications network (e.g., RNC 26) updates the user equipment unit (UE) 30 with a virtual active set of base stations for one or more non-used (e.g., prospective) frequencies. For sake of illustration, this updating of the virtual active set involves the network sending virtual active set messages, collectively represented as the message of action 4-1. As explained below, virtual active set updating can be performed using, e.g., a series of measurement control messages (see FIG. 5A) or a series of virtual active set update messages (see FIG. 5B). Also prior to inter-frequency handover, the user equipment unit (UE) performs its inter-frequency handover measurements (e.g., measurements relative to the physical control channels of the virtual active set [such as the CPICH, for example]). The user equipment unit (UE) makes a report of its inter-frequency measurements as depicted by action 4-2 in FIG. 4. As indicated in FIG. 4, the measurement report of action 4-2 may be event-driven (e.g. triggered by a specified triggering event).

In the context of the illustration of FIG. 4 it is supposed that, as action 4-3, RNC 26 makes a decision that a inter-frequency handover should occur. As action 4-4, RNC 26 issues an inter-frequency handover command to user equipment unit (UE) 30. Upon receipt of the inter-frequency handover command the user equipment unit (UE) 30 can immediately switch to the new frequency required by the inter-frequency handover command, and begin using the virtual active set of base stations as the new current active set. This efficiency is facilitated, at least in part, by the fact that the RNC 26 already knows that the inter-frequency handover will be acceptable in view of the user equipment unit (UE) 30 having already performed measurements contributing to the handover decision. Further, the user equipment unit (UE) may utilize layer 1 information regarding various parameters such as timing channel, estimate, etc. that can be reused when the virtual active set becomes the active set, thereby likely speeding up the process of getting into synchronization after the frequency change.

In accordance with one implementation of the present invention, events for triggering intra-frequency measurements, such as those necessary for making the report of action 4-2, can also be the events which trigger the reporting of inter-frequency measurements and, at the same time, support the maintenance of the virtual active set on the non-used frequency(ies). Thus, in this common triggering event implementation, the reporting criteria needed for maintenance of the virtual active set on the new frequency is the same as currently defined for intra-frequency soft handover measurements. Using the inter-frequency measurements the network can make a inter-frequency handover decision and establish communication to the user equipment unit (UE) using a new and optimal active set as fast as possible after the inter-frequency handover is performed.

Thus, in the first mode of the invention for implementing virtual active set updates, the virtual active set updating is performed by letting the user equipment unit (UE) send event reporting for events on the new frequency and letting those reports trigger the network to send virtual active set control messages, which involves some but a relatively limited amount of signaling.

Two examples of how action 4-1 can be performed for communicating the virtual active set information to the user equipment unit (UE) 30 are illustrated by FIG. 5A and FIG. 5B, respectively. In first example (FIG. 5A), a measurement control procedure with measurement control messages is utilized with the virtual active set update information in the inter-frequency information. In the second example (FIG. 5B), a virtual active set update procedure including frequency information (e.g., the unused or prospective frequency) is sent from the network to the user equipment unit (UE).

FIG. 5A illustrates an example signaling diagram useful in implementing the measurement control procedure alluded to above. In the FIG. 5A example, the virtual active set update messages take the form of a series of measurement control messages.

A measurement control message (MCM) can include many information elements (IEs) (as discussed below) and be of diverse formats. In this regard, FIG. 6A shows some information elements which can be included in an example measurement control message for the present invention. In general, the measurement control message instructs the user equipment unit (UE) to measure one or more radio-related (or other) parameters on the used frequency and on the non-used frequency. The measurement control message also identifies one or more predetermined events and/or conditions which trigger the transmission of a measurement report sent from the user equipment unit (UE) back to the radio network control node. For sake of simplicity, FIG. 6A shows only some information elements of an example measurement control message which are pertinent to the present discussion.

Information element 6A-1 (see FIG. 6A) is a message type information element which, for a measurement control message, has a value identifying the message as a measurement control message (MCM).

Information element 6A-2 is a measurement ID number, which relates the message to a particular measurement (e.g., the fifth measurement, for example). The measurement ID number is used by the network (e.g., UTRAN) in subsequent modification of mobile station measurement and by the mobile station in the measurement report.

Information element 6A-3 is a measurement command field, which can have any one of several values in accordance with the command type which is carried by the message. The command type can indicate whether a function of the message is to set up a new measurement, modify a previously specified measurement parameter, modify a predetermined event or condition, stop measurement, or clear all information stored in the mobile related to a measurement.

Information element 6A-4 is a measurement type, which can indicate (for example) an inter-frequency measurement.

Information element 6A-5 is a measurement reporting mode. If the information element 6A-5 is set to an appropriate value, the measurement report message triggered by a the particular measurement identified in Information element 6A-2 will be sent using an acknowledgment mode (in order that no events be lost).

Information element 6A-6 contains inter-frequency cell information. In particular, Information element 6A-6 has the neighboring cell list (NCL) for inter-frequency neighbors. Information element 6A-12 contains inter-system cell information, which includes the inter-system neighboring cell list. This information specifies the cells and cell parameters for cells belonging to other systems, e.g., GSM, which the user equipment unit (UE) should measure.

Information element 6A-7, inter-frequency measurement quantity, designates the quantity of the cell which is to be measured for event evaluation. For example, Information element 6A-7 may specify CPICH Ec/No, which is the common pilot channel energy per chip divided by the noise density on that frequency.

Information element 6A-8 contains an indication of the inter-frequency measurement reporting quantity, i.e., this information element designates which quantity is to be reported in the event report. For example, Information element 6A-8 could include both the CPICH Ec/No (discussed above) and a frequency quality estimate.

Information element 6A-9 is the inter-frequency set update (IFSU) information element. As shown in FIG. 6A, the inter-frequency set update (IFSU) information element 6A-9 has various components. A first component is field 6A-9-1 which has a first function of indicating whether or not autonomous updating (and reporting of the updates made) is to occur. Thus, for this first function, the field 6A-9-1 of information element 6A-9 has a value indicating that autonomous updating is "on", "on with no reporting", or "off". A second component of the inter-frequency set update (IFSU) information element 6A-9 is the radio link (RL) addition information 6A-9-2, which can contain an identification of a radio link to be added to the virtual active set (i.e., an identification of a cell to be added to the virtual active set). A third component of the inter-frequency set update (IFSU) information element 6A-9 is the radio link (RL) deletion information 6A-9-2, which can contain an identification of a radio link to be deleted from the virtual active set (i.e., an identification of a cell to be deleted from the virtual active set).

Information element 6A-10 includes the intra-frequency measurement reporting criteria. In other words, Information element 6A-10 designates the events to use and other parameters that control the triggering and quality estimate of the frequency ($Q_{carrier}$). Such events can include, for example, the following: a primary CPICH enters the reporting range (for an FDD network); a primary CPICH leaves the reporting range (FDD only); a non-active primary CPICH becomes better than an active primary CPICH (FDD): a change of best cell (FDD); and, a primary CPICH becomes better or worse than an absolute threshold (FDD).

Information element 6A-11 is the inter-frequency measurement reporting criteria. Information element 6A-11 designates the event that can trigger the actual inter-frequency handover (which is commanded by the network using the physical channel reconfiguration message), and also can designate some parameters used for quality estimate of the frequency W. Inter-frequency measurement reporting criteria information can be, e.g. periodical, event-triggered or immediate reporting for an inter-frequency measurement. It may also be specified if the measurement report should be transmitted using either acknowledged or unacknowledged data transfer on the DCCH. The events which can trigger inter-frequency measurement reporting are herein refer enced as "event 2x", where x is a, b, c, . Examples of such events are listed below as events 2a–2b:

Triggering event 2a: Change of best frequency. If any of the non-used frequencies' quality estimates becomes better than the currently used frequency quality estimate, and event 2a has been ordered, then this event shall trigger a report to be sent from the user equipment unit (UE).

Triggering event 2b: The quality estimate of the currently used frequency is below a certain threshold and the quality estimate of a non-used frequency is above a certain threshold.

Triggering event 2c: The quality estimate of a non-used frequency is below a certain threshold.

Triggering event 2d: The quality estimate of the currently used frequency is below a certain threshold.

Triggering event 2e: The quality estimate of a non-used frequency is below a certain threshold.

Triggering event 2f: The quality estimate of the currently used frequency is above a certain threshold.

In the Measurement Control Message generally, qualitative and/or quantitative parameters may be specified and measured. Non-limiting example parameters include measured signal strength, signal power, bit error rate, signal-to-interference ratio, path loss, traffic volume, timing/synchronization offsets, etc. Example predetermined events and/or conditions are described, for example, in U.S. patent application Ser. No. 09/314,019, filed May 19, 1999, entitled "Mobile Station Measurements With Event-Based Reporting" (incorporated herein by reference).

In the example measurement control procedure of FIG. 5A, a radio network control node, e.g., the RNC, a base station, or other controller, generates and transmits a Measurement Control Message (action 5-1) for a user equipment unit (UE). The Measurement Control Message (action 5-1) is preferably included in DCCH, but can be included, for example, in a logical channel (BCCH) in that cell. The measurement control message of action 5A-1 is indicated as such by its type information element 6A-1 being depicted as "MCM". As indicated by the shading in FIG. 5A of the NCL information element 6A-6, the measurement control message of action 5A-1 includes a neighboring cell list for advising the user equipment unit (UE) of which cells are to be monitored. The inter-frequency set update mode information element 6A-9 of the measurement control message of action 5-1 shows in FIG. 5A only its first component which indicates that the non-automatic updating mode of the invention is being utilized, i.e., that automatic updating is "off". It will be appreciated that only selective information elements are displayed for the messages of FIG. 5A, and that not all messages uniformly display the same information elements.

The user equipment unit (UE) 30 responds to the Measurement Control Message 5A-1 with a Measurement Report message (action 5A-2). The timing of the response to Measurement Control Message 5A-1 can be based upon the predetermined events and/or conditions which trigger the transmission of a measurement report as set forth in the inter-frequency measurement reporting criteria information element 6A-11 (see FIG. 6A).

FIG. 5A further shows the network (e.g., RNC) sending further measurement control messages such as messages 5A-3 and 5A-5 to the user equipment unit (UE). Both measurement control messages 5A-3 and 5A-5 have command Information elements 6A-3 which indicate that these messages are associated with a command to. "MODIFY" the previously sent measurement control message having the same ID. In accordance with the example of FIG. 5A, and as depicted by the shaded IFSU Information elements 6A-9 thereof, the measurement control messages 5A-3 and 5A-5 contain information for updating the virtual active set of base stations. For example, the inter-frequency set update (IFSU) information elements 6A-9 might indicate which particular virtual active set (of possible plural virtual active sets) is to be updated, how that particular virtual active set is to be updated (e.g., a cell added, removed, or replaced), and the CPICH of the cell which is affected by the update. For example, with reference to FIG. 3, whereas the NCL information element 6A-6 of measurement control message 5A-1 might list Cells A–C, the second component of the measurement control messages 5A-3 might (in their IFSU information elements 6A-9) specify that Cell D and Cell E, respectively, are to be added to the first virtual active set.

FIG. 5A further illustrates the transmission of measurement report messages back from the user equipment unit (UE) to the RNC 26, such as the messages of actions 5A-4 and 5A-6. For the present illustration, it is assumed that the measurement report message of action 5A-6 reports that a non-used frequency (e.g., Frequency 2 of the first virtual active set) is better than the used frequency (e.g., Frequency 1 of the active set). Based on this report, as depicted by event 5A-7, the network (e.g., RNC 26) makes a decision to switch the user equipment unit (UE) from the used frequency (e.g., Frequency 1) to the non-used frequency (e.g., Frequency 2). Such decision is communicated as the inter-frequency handover command shown as event 5A-7 (also known as a physical channel reconfiguration message) to the user equipment unit (UE).

In accordance with the invention as above illustrated with respect to FIG. 5A, the user equipment unit (UE) must measure on the non-used frequency(ies). The virtual active set reuses the intra-frequency events, and new events (examples of which are provided below), which may ultimately indicate a need for frequency change.

FIG. 5B illustrates an example signaling diagram useful in implementing the virtual active set update procedure alluded to above. In the FIG. 5B example, the virtual active set messages take the form of a series of virtual active set update messages sent from the network to the user equipment unit (UE). As with the measurement control message (MCM), the virtual active set update message (VASUM) can include many information elements (IEs) and be of diverse formats. For sake of simplicity, FIG. 6B shows only some information elements of an example virtual active set update message which are pertinent to the present discussion, particularly a message type information element 6B-1 and inter-frequency set update (IFSU) information element 6B-9.

The scenario of FIG. 5B starts in similar manner as that of FIG. 5A, e.g., with the network (e.g., RNC 26) sending a Measurement Control Message (action 5B-1) to a user equipment unit (UE). The Measurement Control Message of action 5B-1 includes a neighboring cell list (NCL) for advising the user equipment unit (UE) of which cells are to be monitored. The user equipment unit (UE) 30 responds to the Measurement Control Message 5A-1 with a Measurement Report message (action 5B-2).

In the FIG. 5B scenario, the network issues a series of virtual active set messages (VASUM) in order to update the virtual active set(s) maintained by the user equipment unit (UE). FIG. 5B shows two examples such virtual active set messages (VASUM) as being issued, as depicted by actions 5B-3 and 5B-6. The fact that the messages of actions 5B-3 and 5B-6 are, in fact, virtual active set update messages is indicated by their message type information element 6B-1 (Type=VASUM as shown in FIG. 5B). Each VASUM message includes the inter-frequency set update (IFSU) information element 6B-9, as indicated by the field IFSU in the VASUM messages of actions 5B-3 and 5B-6. The inter-frequency set update (IFSU) information element 6B-9 has essentially the same format as the corresponding information element of the Measurement Control Message (MCM), as discussed above. That is, the inter-frequency set update (IFSU) information element 6B-9 specifies how the virtual active set is to be updated (e.g., a cell added, removed, or replaced), and the CPICH of the cell which is affected by the update.

In response to each virtual active set update message, the user equipment unit (UE) issues a virtual active set update complete message. In this regard, FIG. 5B shows the virtual active set update messages of actions 6B-3 and 6B-6 being answered by the virtual active set update complete messages of actions 6B-4 and 6B-7, respectively.

In addition, as with the scenario of FIG. 5A, FIG. 5B further illustrates the transmission of measurement report messages back from the user equipment unit (UE) to the RNC 26, such as the messages of actions 5B-5 and 5B-8. For the present illustration, it is assumed that the measurement report message of action 5B-8 reports that a non-used frequency is better than the currently used frequency. Based on this report, as depicted by event 5B-9, the network (e.g., RNC 26) makes a decision to switch the user equipment unit (UE) from the currently used frequency to the non-used frequency. Such decision is communicated as the inter-frequency handover command shown as event 5B-10 (also known as a physical channel reconfiguration message) to the user equipment unit (UE).

Thus, the example of FIG. 5B involves a virtual active set update procedure. Inter-frequency active set update messages of the present invention contain the changes of the active set associated with a non-used frequency. The information provided by the Inter-frequency active set update message (VASUM), makes it possible to use events defined for Intra-frequency measurement within the same non-used frequency for Inter-frequency measurement reporting criteria.

Figure 5C:
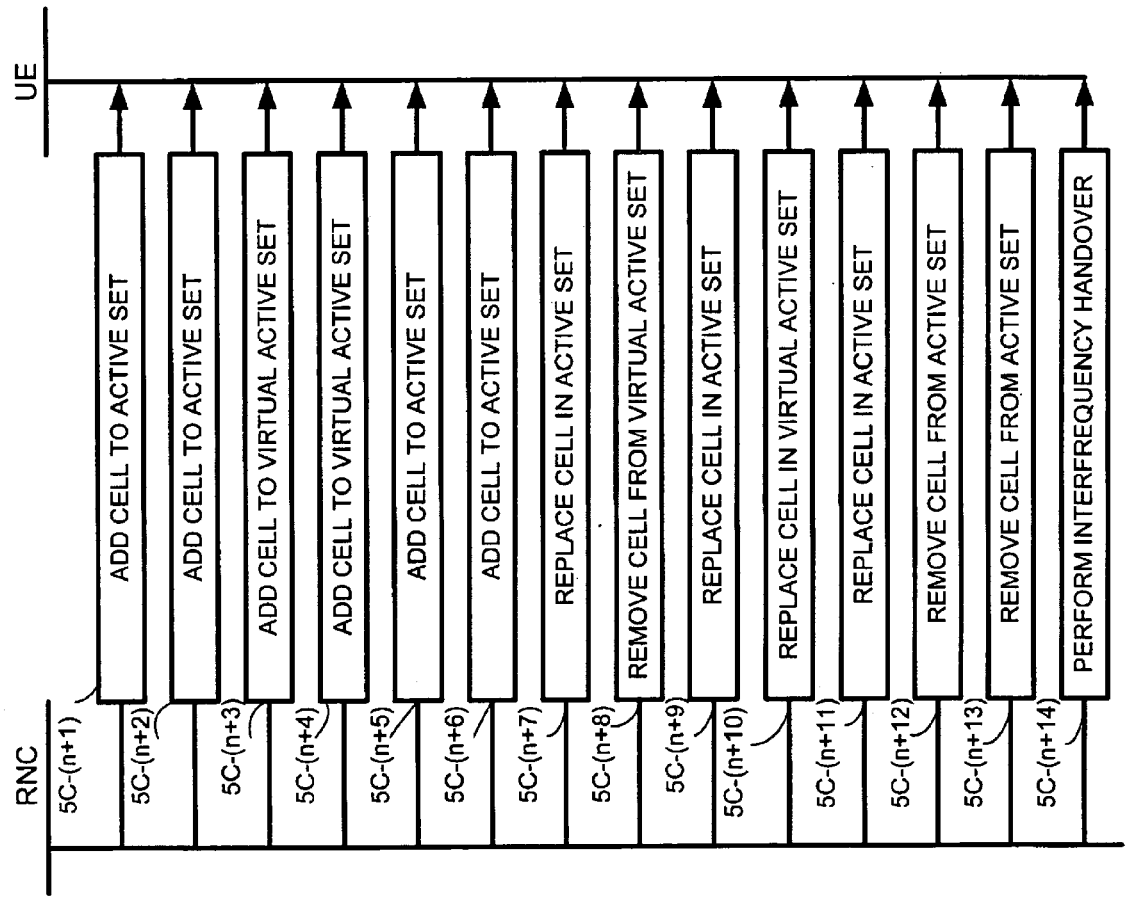
FIG. 5C is a diagrammatic view illustrating an example scenario of updating messages including active set updating messages and virtual active set updating messages issued to a user equipment unit over time.

It has been described above, using various implementation examples, how the virtual active set can be updated. Although not specifically stated as such above, it should be understood that the updating of the active set for the user equipment unit (UE) is also occurring via messages from the network. For example, in accordance with events reported by the user equipment unit (UE), the network may intersperse its virtual active set updating messages with messages for updating the active set. In this regard, FIG. 5C illustrates an example scenario of updating messages issued to a user equipment unit (UE) over time, culminating in an interfrequency handover command 5C-(n+14). For sake of clarity, FIG. 5C does not show other messages transmitted between the RNC and the user equipment unit (UE), it being understood that such other messages (such as measurement report messages) are, in fact, transmitted.

In a second mode of the invention for implementing virtual active set updates, the network authorizes the user equipment unit (UE) to perform autonomous virtual active set updates with or without sending reports to the network upon the occurrence of certain network-specified events. Then, when a subsequent measurement report from the user equipment unit (UE) warrants, the network issues an inter-frequency handover command.

Figure 7:
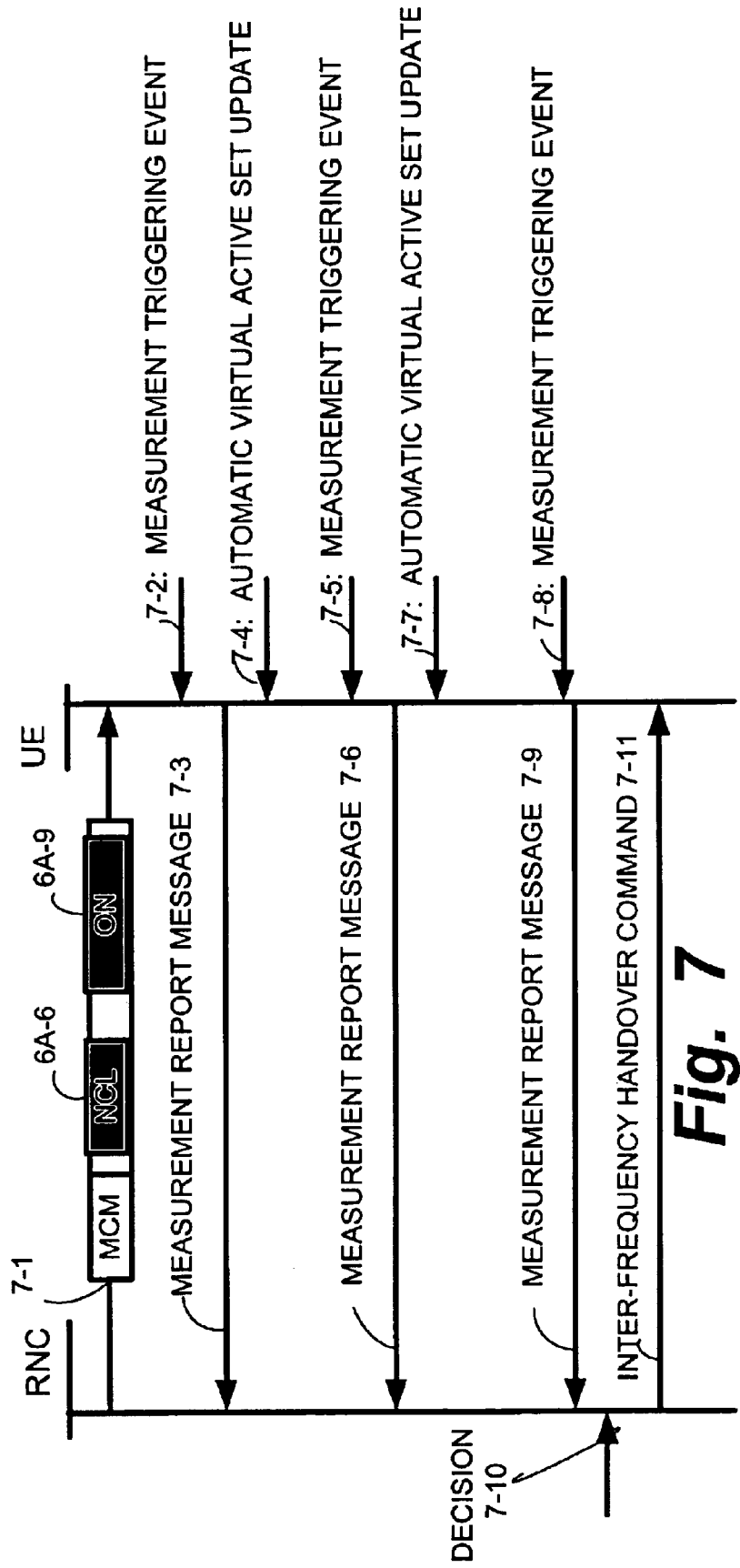
FIG. 7 is a diagrammatic view showing a sequence of basic actions involved in a second mode of the present invention for implementing virtual active set updates.

In this second mode of the invention implementing virtual active set updates, the network authorizes the user equipment unit (UE) to perform an autonomous virtual active set update upon occurrence of certain network-specified events. The second mode of the invention is depicted generally in FIG. 7. The scenario of FIG. 7 starts in similar manner as that of FIG. 5A, e.g., with the network (e.g., RNC 26) sending a Measurement Control Message (action 5B-1) to a user equipment unit (UE). For the second mode, the inter-frequency set update (IFSU) information element 6A-9 of message 7-1 has its first component as illustrated in FIG. 7 indicating that autonomous updating is "on". With autonomous updating being "on", the user equipment unit (UE) updates the virtual active set by itself and sends a measurement report.

As indicated in FIG. 7 of the NCL information element, the measurement control message of action 7-1 includes a neighboring cell list (NCL) in information element 6A-6 for advising the user equipment unit (UE) as to which cells are to be monitored. In addition, the measurement control message of action 7-1 (or another message) conveys to the user equipment unit (UE) the events which trigger measurements and the events which trigger a virtual active set update. In this regard, the measurement control message of action 7-1 includes the information element 6A-10 which provides the intra-frequency measurement reporting criteria, as well as the information element 6A-11 for reporting the inter-frequency measurement reporting critieria. The information element 6A-10 designates the criteria for updating the virtual active set of cells for non-used frequencies. The information element 6A-11 designates the events that trigger when the estimated quality of a non-used frequency is better than the estimated quality of the currently used frequency, taking into consideration the combined effect of the active set cells and the combined effect of the virtual active set cells.

For example, the measurement control message of action 7-1 includes the inter-frequency measurement reporting criteria information element 6A-11 which designates the event that can trigger both a measurement report and update of the virtual active set.

FIG. 7 further shows a measurement report-triggering event occurring as action 7-2. In response to the measurement report-triggering event of action 7-2, the user equipment unit (UE) both (1) sends a measurement report message as action 7-3 to the network; and (2) performs an automatic virtual active set update (indicated as action 7-4). In the automatic virtual active set update, the triggering event (e.g., event 1x) triggers transmission of the measurement report message of action 7-3 also causing the adding, replacing, or removing of a cell from the virtual active set on the frequency measured. In other words, the network has already advised the user equipment unit (UE) regarding how the virtual active set is to be affected upon the occurrence of the triggering event, so that the user equipment unit (UE) can itself perform the update upon the occurrence of the triggering event. FIG. 7 just happens to illustrate three triggering events occurring in series, e.g., triggering events 7-2, 7-5, and 7-8, with triggering events 7-2 and 7-5 being of a nature to affect the virtual active set as well as spawning the measurement report messages of action 7-3 and action 7-6, respectively. The triggering event 7-8 (event 2x) occurs because the non-used frequency is better than the used frequency, causing the measurement report message of action 7-9 to be transmitted to the network. Upon being apprised of this situation, as action 7-10 the network makes a decision to change the user equipment unit (UE) from the currently used frequency to the new frequency. As action 7-11, RNC 26 issues an inter-frequency handover command to user equipment unit (UE) 30, whereupon receipt of the inter-frequency handover command (physical channel reconfiguration message) the user equipment unit (UE) 30 can immediately switch to the new frequency required by the inter-frequency handover command, and begin using the virtual active set of base stations as the new current active set.

In the second mode above described relative to FIG. 7, the network orders or authorizes the user equipment unit (UE) to update the virtual active set autonomously, e.g., with an autonomous authorization message or with an information element of another message which includes autonomous authorization. Such authorization can occur by the network specifying certain event(s) or a parameter(s) that should trigger a virtual active set update. Upon occurrence of the event(s) and/or parameter(s), the user equipment unit (UE) performs the update of the virtual active set autonomously without any signaling. When an event like event 1x occurs, the network has a reason for knowing (e.g., a measurement report issued at that instance) the cells included in the active set since, it is then a matter of resource allocation in the network.

Thus, in the second mode the user equipment unit (UE) performs the update of the virtual active set autonomously instead of having the user equipment unit (UE) send a measurement report to the network and wait for a measurement control order that contains a virtual active set update. Advantageously, the second mode reduces signaling.

Except when incompatible, various aspects of the first mode of the invention are applicable to the second mode of the invention as well. For example, in the autonomous updating of the second mode the network still needs events and associated reports that relates to comparison between the used and non-used frequencies. That is, in the second mode the user equipment unit (UE) still reports the events specified for inter-frequency reporting criteria when two frequencies are compared. The physical measurements regarding the non-used frequencies must still be performed by the user equipment unit (UE) in order to maintain the active set, but the measured values do not have to be sent as frequently to the network, particularly in the second mode wherein autonomous updating is performed by the user equipment unit (UE).

In the present invention, inter-frequency measurement reporting criteria relates to the case when CPICHs on different frequencies are compared to each other, while intra-frequency reporting criteria relates to the case when CPICHs on the same frequency are compared to each other. Note that, according to this terminology, intra-frequency measuring reporting criteria also applies for CPICHs on other frequencies than the frequency used for the current active set. Inter-frequency measurements reporting criteria is in this way not related to how the actual measurement is done by the user equipment unit (UE), but rather if the reporting criteria relates to comparison between CPICHs on different frequencies or if the comparisons is done between CPICH's within the same frequency. In order to evaluate if a certain frequency should be used instead of the currently used frequency, the Inter frequency reporting events defined above with reference to Information element 6A-11 are utilized. By using cell individual offset for the cells of the non-used frequency the trigger point of events 2a–2f can be altered.

In another of its aspects, the present invention provides the network with a quality estimate for an active set on a frequency (whether the active set be the current [real] active set or the virtual active set). This frequency quality estimate can be utilized to trigger a change or switch of frequencies.

One example of how the frequency quality estimate of the invention can be employed occurs when determining whether to change or switch from a first UTRAN frequency to a second UTRAN frequency. For such an example, a UTRAN frequency quality estimate (referred to herein as the UTRAN quality estimate) is expressed by Equation 1. Advantageously, although applicable for triggering inter-frequency event reporting for the present invention, Equation 1 resembles prior techniques for triggering intra-frequency event reporting.

Equation 1:

$$Q_{carrier_j} = 10 \cdot Log M_{carrier_j} = 10 \cdot Log\left(W_j \cdot \left(\sum_{i=1}^{N_{Aj}} M_{i_j}\right) + (1 - W_j) \cdot M_{Best_j}\right)$$

The variables in Equation 1 are defined as follows:

$Q_{frequency\ j}$ is the estimated quality of the active set on frequency j.

$M_{frequency\ j}$ is the estimated quality of the active set on frequency j.

$M_i$ is a measurement result of cell i in the active set.

$N_A$ is the number of cells in the active set.

$M_{Best}$ is the measurement result of the strongest cell in the active set.

W is a parameter with the value range 1–0 sent from UTRAN to UE

W=0 only the measurement results from the best cell on frequency j is used.

W=1 only the sum of the measurement results from the cells in the active set is used.

Two other measurements, taken from TSGR#5(99)563, RAN 25.215 v.2.0.0, "Physical Layer-Measurements (FDD)", can also be used in Equation 1. A first of these measurements is CPICH RSCP, which is essentially the signal strength received on the code used for the CPICH in a cell (where M is in milliwatt and $Q_{frequency\ j}$ is in dBm in Equation 1). A second of these measurements is CPICH Ec/N0, which is the signal to noise ratio received on the code used for the CPICH in a cell (where M is a ratio and $Q_{frequency\ j}$ is in dB in Equation 1).

Equation 1 can be weighted in accordance with whether the sum of cells in the active set is significant or whether it is the best cell only that should be taken into account when the total quality for the reception on one frequency is calculated. Many cells in the active set should give enhanced quality as compared to only one cell.

The UTRAN quality estimate can be used for inter-frequency comparison, i.e., the UTRAN quality estimate for the real or current active set can be compared with the UTRAN quality estimate for the virtual active set in order to determine if an inter-frequency handover should occur. Such inter-frequency comparison and triggering can be prompted by various inter-frequency events (resembling those listed above in connection with Information element 6A-11 of the Measurement Control Message (MCM) of FIG. 6A), and include the following:

Triggering event 2a: Change of best UTRAN frequency.

Triggering event 2b: The UTRAN quality estimate of the currently used UTRAN frequency is below a certain threshold (e.g., a threshold "Q_search_for_another_frequency") and the UTRAN quality estimate of a non-used UTRAN frequency is above another threshold (e.g., a threshold "Q_accept_another_frequency").

Triggering event 2c: The UTRAN quality estimate of the currently used UTRAN frequency is below a certain threshold (e.g., a threshold "Q_search_for_another_frequency").

Triggering event 2d: The UTRAN quality estimate of a non-used UTRAN frequency.is above another threshold (e.g., a threshold "Q_accept_another_frequency").

Triggering event 2e: The UTRAN quality estimate of a non-used frequency is below a certain threshold.

Triggering event 2f: The UTRAN quality estimate of the currently used frequency is above a certain threshold.

Figure 8:
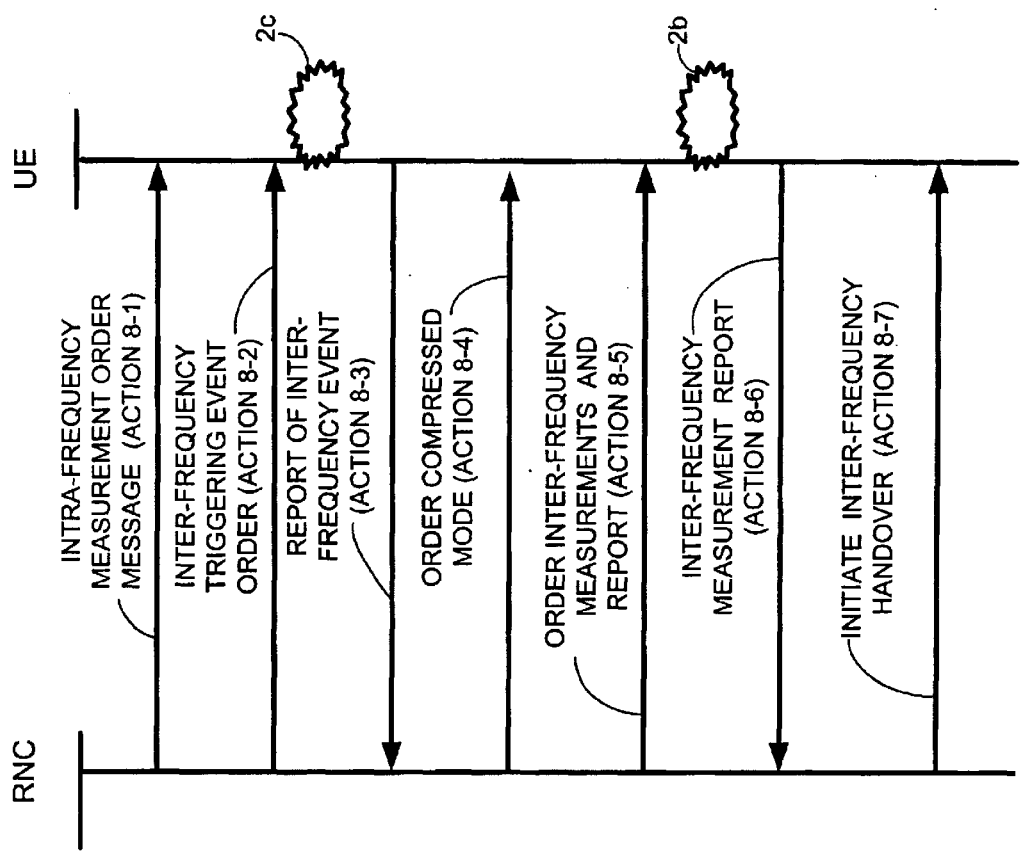
FIG. 8 is a diagrammatic view showing basic actions in a scenario which utilizes the UTRAN quality estimate in connection with a handover from one UTRAN frequency to another UTRAN frequency.

FIG. 8 depicts a scenario which utilizes the UTRAN quality estimate in connection with a handover from one UTRAN frequency to another UTRAN frequency. As reflected by action 8-1, the network has ordered the user equipment unit (UE) to perform intra-frequency measurements. In the illustrated scenario, it so happens that the user equipment unit (UE) is using certain events 1A, 1B, 1C for updating the active set. These events 1A, 1B, and 1C are defined as follows: event 1A is that the network should consider adding a cell to the active set; event 1B is that the network should consider removing a cell from the active set; event 1C is that the network should consider replacing a cell with another in the active set. Action 8-2 shows that the user equipment unit (UE) has also been ordered to use the inter-frequency triggering event 2c (described above) for prompting the inter-frequency comparison. That is, the user equipment unit (UE) is required to report when the UTRAN quality estimate for currently used UTRAN frequency becomes worse than a predefined absolute threshold (e.g., the threshold "Q_search_for_another_frequency").

When the inter-frequency triggering event 2c actually occurs (the currently used UTRAN frequency falling below the absolute threshold), such occurrence is reported by the user equipment unit (UE) to the network as shown by action 8-3 in FIG. 8. Then, as reflected by action 8-4, the network employs a physical channel reconfiguration message to direct the user equipment unit (UE) to start using a compressed mode to allow for inter-frequency measurements.

Once the compressed mode is begun, as illustrated by the message of action 8-5 the network orders the user equipment unit (UE) to perform inter-frequency measurements and to send a measurement report when the inter-frequency triggering event 2b is triggered. As described above, the inter-frequency triggering event 2b occurs when both (1) the estimated quality for currently used UTRAN frequency is below a specified threshold (e.g., the threshold "Q_search_for_another_frequency") and (2) the UTRAN quality estimate for a non used UTRAN frequency is above another threshold (e.g., the threshold "Q_accept_another_frequency").

When inter-frequency triggering event 2b actually occurs, the user equipment unit (UE) sends a measurement report (as action 8-6), which also serves to confirm that inter-frequency triggering event 2b is triggered. Then, in response, as action 8-7, the network initiates an inter-frequency handover. If the inter-frequency handover is successfully performed the resources in UTRAN for the old frequency are released and the connection is continued using the new UTRAN frequency.

It will be appreciated, particularly in light of the previous discussion, that actions 8-1 and 8-2 can occur simultaneously, e.g., in the same network message to the user equipment unit (UE).

The hysteresis protection for going back from the selected frequency is at least the difference in the two thresholds described above, e.g., at least the difference [(Q_accept_ another_frequency)-(Q_search_for_another_frequency)]. Both thresholds are compared against measurements on the same cell(s). The only difference is that measurement samples are typically obtained more often for comparison against the threshold "Q_search_for_another_frequency". This property of the suggested threshold definitions is assumed to enable the hysteresis protection to be consistent and stable for different UE implementations that allow the operator to use a relatively small hysteresis. Small hysteresis reduces the required coverage overlap between the frequencys. The reduced hysteresis requirements allow also a UTRAN frequency to be offloaded by another frequency in a larger area as compared to the case when large hysteresis is needed.

Figure 9:
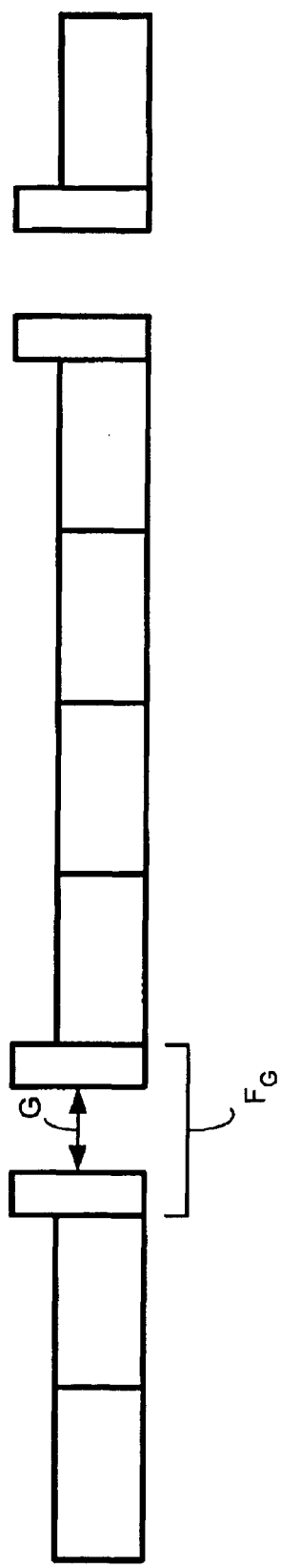
FIG. 9 is a diagrammatic view showing an example compressed mode transmission usable with an aspect of the present invention.

Those skilled in the art will appreciate how the compressed mode ordered by action 8-4 facilitates the inter-frequency measurements. Briefly, as illustrated by the example of FIG. 9, in the compressed mode some slots (e.g., frames), such as frame $F_G$, are used for measurements. These predominately measurement frames (or "compressed" frames) such as frame $F_G$ include a transmission gap G which is available for inter-frequency measurements. As depicted by FIG. 9, the instantaneous transmit power is increased in the compressed frame FG in order to keep quality (as determined, e.g., by BER or FER, etc.) unaffected by the reduced processing gain. The rate and type of compressed frames is variable, and is controlled by the network and depends upon the environment and measurement requirements.

As explained in more detail below, the principles of the present invention are applicable for inter-system handover when a user equipment unit (UE) has dual system capability. Various example scenarios of inter-system handover are illustrated with respect to FIG. 3A–FIG. 3D and are discussed at appropriate junctures below. Advantageously, the example scenarios of inter-system handover can employ the quality estimate aspect of the present invention discussed above.

Figure 3A:
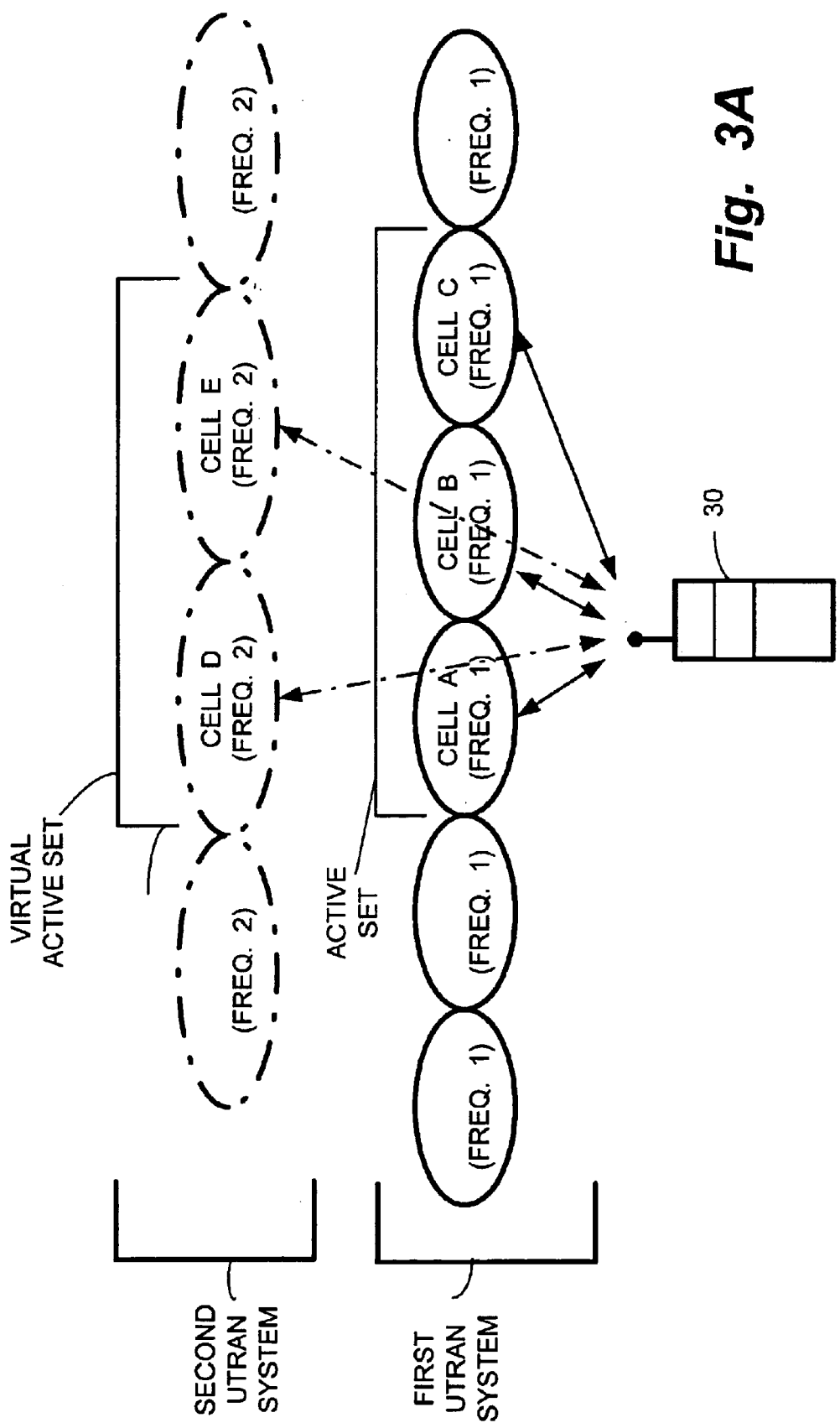
FIGS. 3A-3D are diagrammatic views showing various scenarios of inter-system handover in accordance with the present invention.

The first example inter-system handover scenario, illustrated in FIG. 3A, shows dual system user equipment unit (UE) having an active set in a first UTRAN system and a virtual active set in a second UTRAN system. The quality estimate such as that provided by Equation 1 can be utilized in making a comparison for handover from the first UTRAN system to a second UTRAN system. When making a comparison in anticipation of a system handover, the UTRAN quality estimate of Equation 1 for a UTRAN frequency takes into account to some extent the anticipated macro diversity gain from soft handover. Further, the quality estimate allows the network to use UTRAN cells at lower signal levels when performing inter-system handover than if only the best UTRAN cell is included in the quality estimates. Advantageously, the quality estimate for the active set is based on a same formula as can be used for calculating the reporting range used in intra-frequency reporting events. Moreover, the quality estimate can be used as decision criteria for such decisions as (1) determining when to start compressed mode measurements; or (2) determining that an inter-system handover from the UTRAN cells used on a UTRAN frequency to a GSM cell should be performed (further described below in connection with the scenario of FIG. 3D).

Figure 3B:
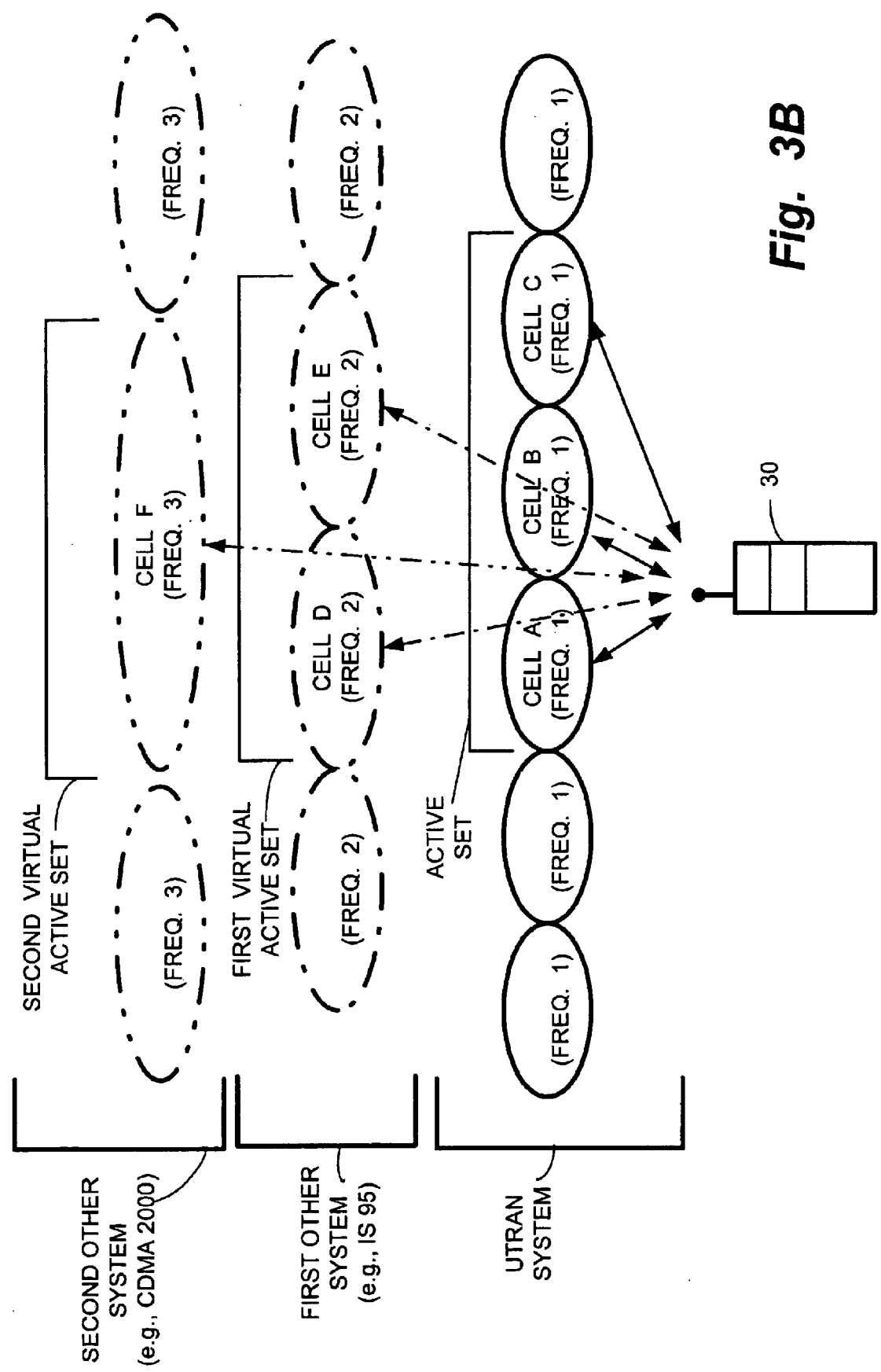

A second example inter-system handover scenario, illustrated in FIG. 3B, shows dual system user equipment unit (UE) having an active set in a first UTRAN system; a first virtual active set in a first other (e.g., non-UTRAN) system; and a second virtual active set in a second other (e.g., non-UTRAN) system. The "other" (non-UTRAN) systems shown in the scenario of FIG. 3B are systems which permit soft intra-frequency handover. For example, the first other system of FIG. 3B is an IS-95 system; the second other system of FIG. 3B is a CDMA 2000 system.

Figure 3C:
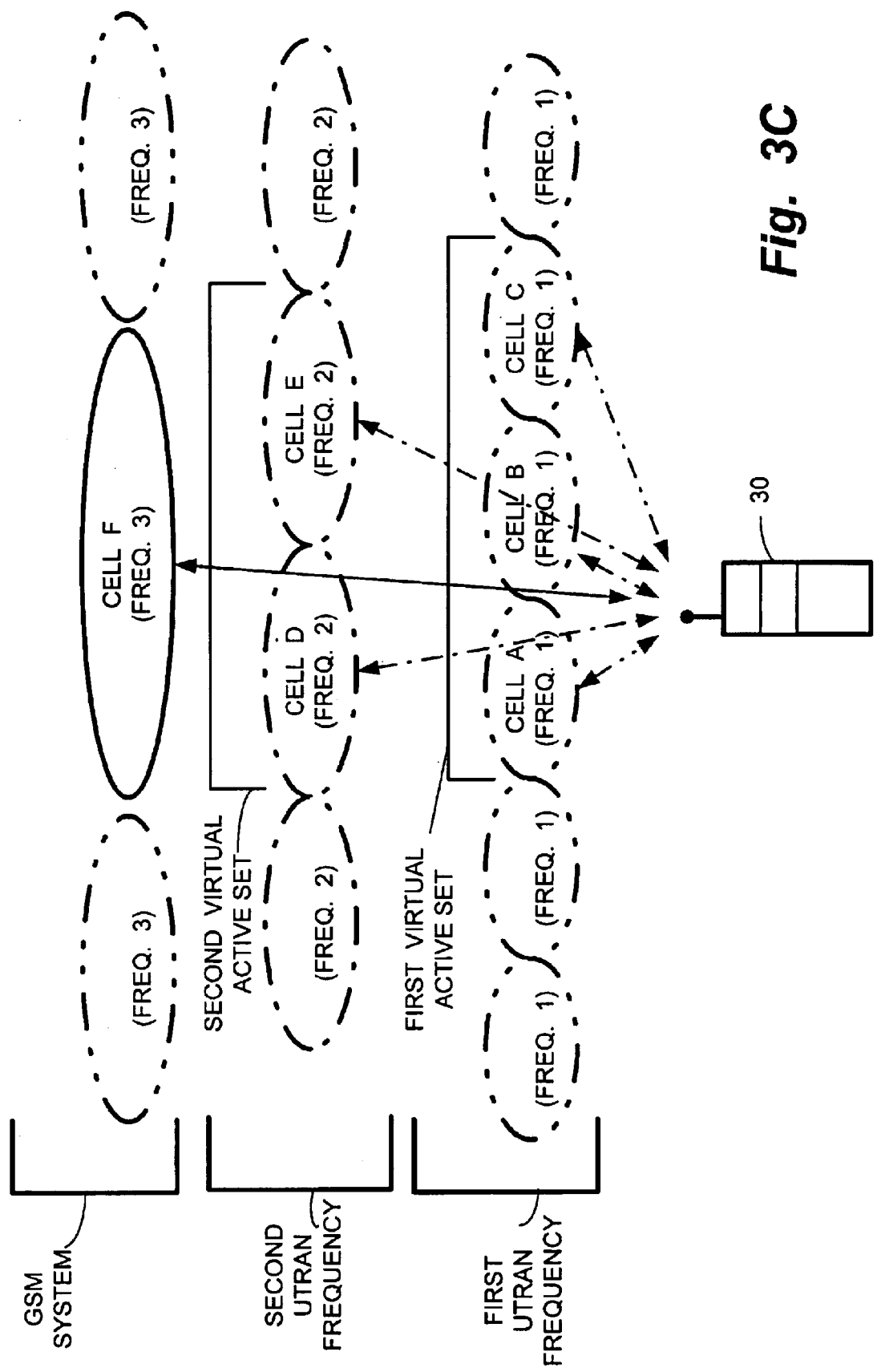

In the third example inter-system handover scenario depicted in FIG. 3C, the quality estimate such as that provided by Equation 1 can be utilized in making a comparison for handover from a non-soft intra-frequency handover type system (e.g. GSM system) to another system (e.g., a UTRAN system). In particular, in the scenario of FIG. 3C, user equipment unit (UE) is using cell F in the GSM system. However, in contemplation of possible handover to a UTRAN system, user equipment unit (UE) is maintaining a first virtual active set on a first UTRAN frequency (frequency 1) and a second virtual active set on a second UTRAN frequency (frequency 2). The first virtual active set comprises cells A, B, and C; the second virtual active set comprises cells D and E.

Thus, in the inter-system comparison of the FIG. 3C scenario, the UTRAN quality estimate of Equation 1 is utilized for the system having the UTRAN frequencies. The quality estimate of the GSM cell, on the other hand, is mainly based on two factors: (1) the measurement of the GSM carrier Radio Signal Strength Indication (RSSI), which is a signal strength measure commonly expressed as a logarithm; and (2) whether the Base Transceiver Station Identity Code, Base Station Identifier Code (BER) has been confirmed or not. The RSSI and the BER are described briefly in the two ensuing paragraphs.

As described in U.S. Pat. No. 6,006,077, which is incorporated herein by reference, cellular phones using a Time Division Multiple Access method conforming to either the European cellular standard known as GSM or any of the American TDMA standards, for example, those known respectively as D-AMPS, IS54, IS136 or PCS1900, may use spare time between transmit and receive timeslots to change frequency and monitor the signal strengths of other base stations. Several measurements of signal strength may be averaged for the same base station. The mobile phone makes measurements of the signal strengths received from surrounding base stations even during the progress of a call. Mobile Assisted Handover (MAHO) may be implemented using these measurements. The averages are typically reported to the currently serving base station, which determines if a handoff should be made to another, base station. The mobile typically reports MAHO RSSI measurements to the network station using a low-bitrate, inband signaling channel called the Slow Associated Control Channel or SACCH. The network uses SACCH measurements to determine the optimum base station to handle a call in progress, preferably the base station that the mobile phone is receiving most strongly.

In GSM, for a cell selection or cell reselection, i.e., for setting up a connection to the base station of a radio cell, the user equipment unit (UE) is to synchronize with the carrier frequency of the BCCH (Broadcast Control Channel) transmitted by the base station, and to read BCCH data. The BCCH data contain system information and the BER (Base Transceiver Station Identity Code, Base Station Identifier Code). A radio cell selected in this way is called a serving cell. In accordance with the standardized GSM recommendations, a mobile radio station is to try at least every thirty seconds to decode the BCCH of a serving cell. Furthermore, a mobile radio station is expected to verify at least every 10 seconds the BSIC of the other radio cells having the highest average receiving level. The BSIC is transmitted over the BCCH in signal beams by means of Synchronization Bursts (SB). See, for example, U.S. Pat. No. 6,002,940, which is incorporated herein by reference.

Returning to the basic description of obtaining a quality estimate for a GSM cell, it is assumed that the user equipment unit (UE) confirms the BSIC when a measurement on a GSM cell is started. If the user equipment unit (UE) sends a measurement report before the BSIC has been confirmed, the user equipment unit (UE) indicates that the BSIC is unconfirmed in the measurement report but nevertheless provides the network with the RSSI information on the frequency. The network has the option to request that the user equipment unit (UE) perform a BSIC confirmation periodically on a measured GSM cell or once immediately upon request from the network.

Figure 11:
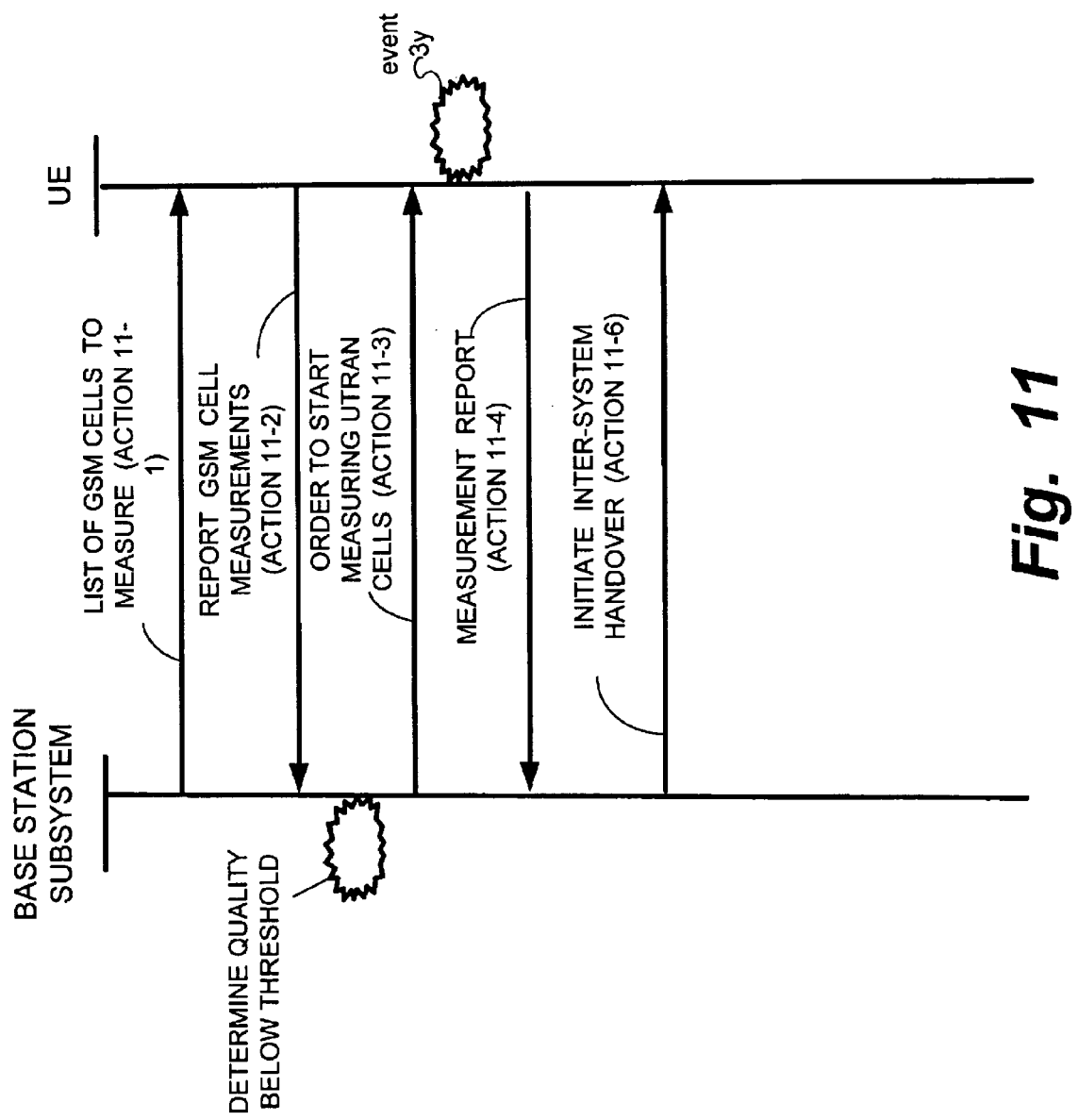

FIG. 11 depicts a representative example scenario which utilizes the UTRAN quality estimate in connection with a handover from a GSM system to a UTRAN system (e.g., to UTRAN cell(s)). In FIG. 11, the "network" refers to the GSM network.

The network determines, from a measurement report such as action 11-2, that the quality on the current serving GSM cell (i.e., the best GSM cell) goes below an operator defined threshold (e.g., the threshold "Q_search_for_UTRAN"). When this determination occurs, the user equipment unit (UE) is ordered by a measurement control message of (action 11-3) to start measuring UTRAN cells and to report when an event 3y occurs. Event 3y is defined to occur when both (1) the estimated quality for currently used GSM cell is below a specified threshold (e.g., the threshold "Q_search_for_UTRAN") and (2) the UTRAN quality estimate for a UTRAN frequency is above an acceptable threshold (e.g., the threshold "Q_accept_UTRAN"). The measurement on UTRAN cells may also be triggered by the fact that the user equipment unit (UE) is connected to a GSM cell that is operator-defined to have UTRAN neighboring cells.

Initially, in the scenario of FIG. 11 the user equipment unit (UE) is camping on a GSM cell. Action 11-1 shows the user equipment unit (UE) receiving from the network a list of GSM cells, including neighboring cells, for measurements are to be performed according to GSM specifications. Once the list of action 11-1 is received, the user equipment unit (UE) reports GSM cell measurements periodically. Action 11-2 shows one instance of a report of the GSM cell measurements to the network.

The network determines, from a measurement report such as action 11-2, that the quality on the current serving GSM cell (i.e., the best GSM cell) goes below an operator defined threshold (e.g., the threshold "Q_search_for_UTRAN"). When this determination occurs, the user equipment unit (UE) is ordered by a measurement control message of (action 11-3) to start measuring UTRAN cells and to report when an event 3y occurs. Event 3y is defined to occur when both (1) the estimated quality for currently used GSM cell is below a specified threshold (e.g., the threshold "Q_search_for_UTRAN") and (2) the UTRAN quality estimate for a UTRAN frequency is above an acceptable threshold (e.g., the threshold "Q_accept_UTRAN"). The measurement on UTRAN cells may also be triggered by the fact that the user equipment unit (UE) is connected to a GSM cell that is operator-defined to have UTRAN neighboring cells.

When inter-frequency triggering event 3y actually occurs, the user equipment unit (UE) sends a measurement report (as action 11-4), which also serves to confirm that event 3y has occurred. Then, in response, as action 11-5, the network initiates an inter-system handover. If the inter-system handover is successfully performed the resources in GSM are released and the connection is continued using the UTRAN cell(s).

As understood from the foregoing, when performing handover from GSM to UMTS the dual system user equipment unit (UE) may maintain one or several virtual active sets for the UMTS system based on the dual system user equipment unit (UE) measurements on UMTS cells when connected to a GSM cell that is sent in the request from a GSM base station to a UTRAN RRC when performing handover from GSM to UTRAN.

The forgoing scenario which uses Q_accept_UTRAN and Q_search_for_GSM is just one example of an algorithm that may use the virtual active set ability. The user equipment unit (UE) may create an opinion of the virtual active set from the measurement on the UTRAN cell while camping on a GSM cell, and this virtual active set can be used as the default active set to start with when an inter-system handover is triggered to UTRAN.

Figure 3D:
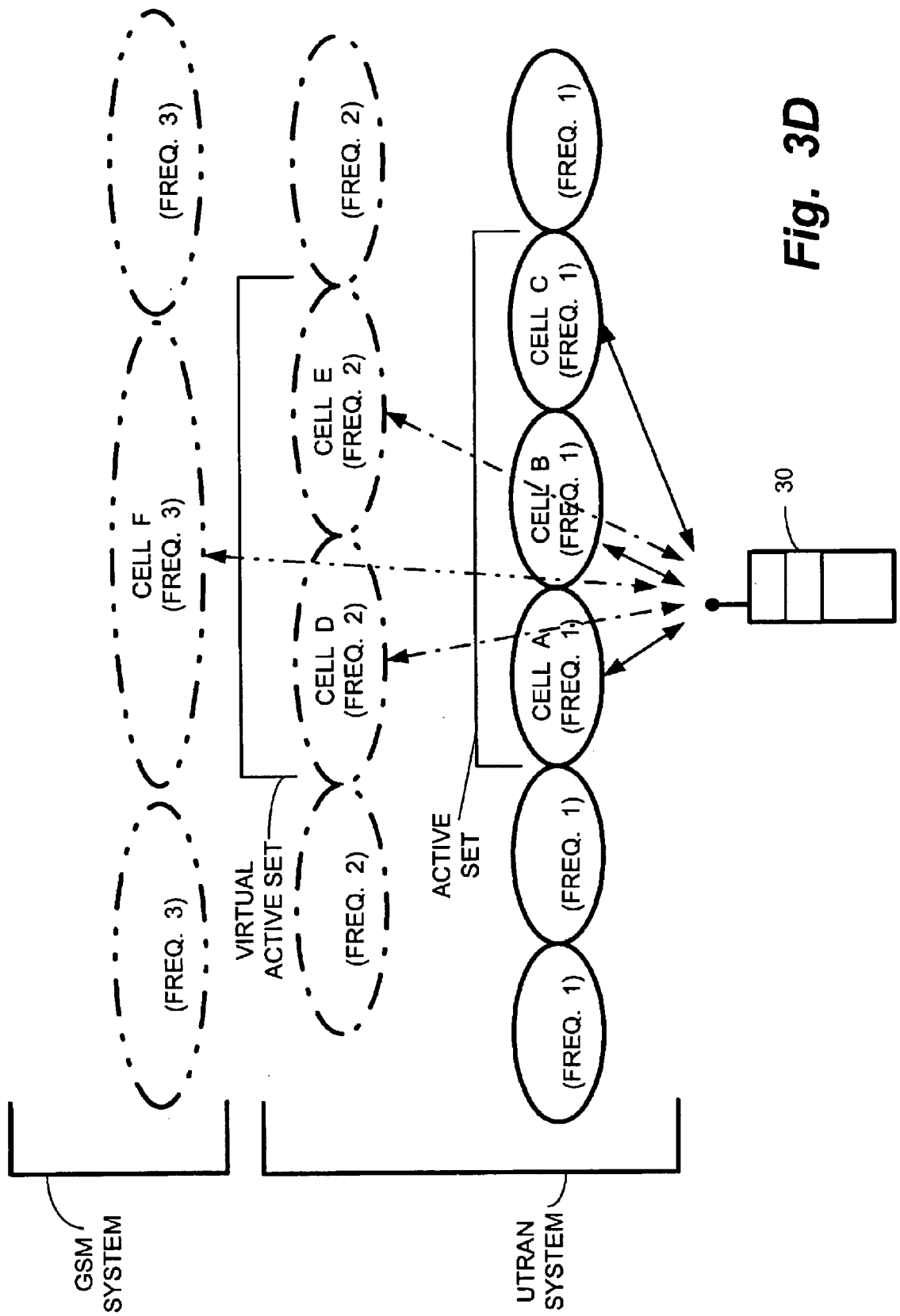

In the fourth example inter-system handover scenario depicted in FIG. 3D, a system handover occurs from a UTRAN system to non-soft intra-frequency handover type system (e.g. GSM system). Specifically, in the example scenario of FIG. 3D, user equipment unit (UE) has an active set on a first UTRAN frequency (frequency 1); a virtual active set on a second UTRAN frequency (frequency 2); and monitors cell F in the GSM system. The active set comprises cells A, B, and C; the virtual active set comprises cells D and E.

When contemplating inter-system handover from a UTRAN system to a GSM system, only one GSM cell (e.g., cell F) is considered as a target, as there is no virtual active set in GSM. In the FIG. 4 example scenario, a decision to handover from a first UTRAN frequency to GSM or from the first UTRAN frequency to a second UTRAN frequency can be based on estimating the quality of the active set and comparing (1) the estimated quality of the active set to the estimated quality of the virtual active set; (2) the estimated quality of the active set to the estimated quality of the GSM cell.

Figure 10:
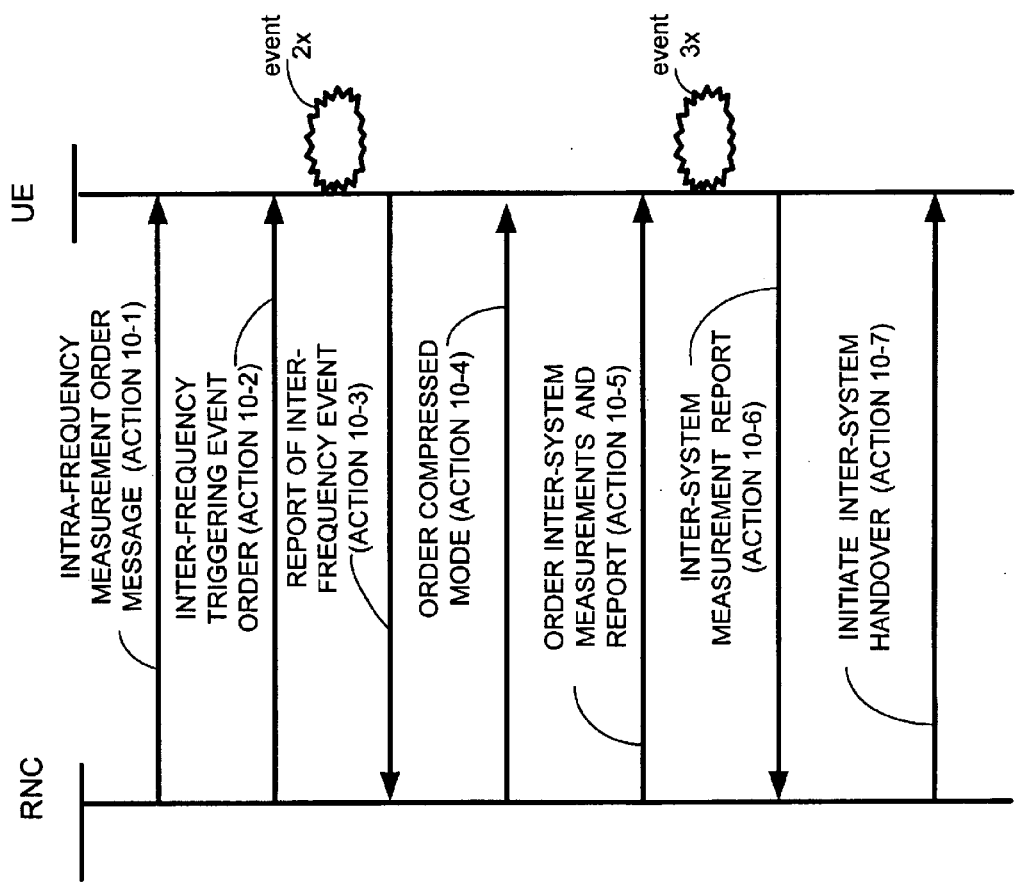
FIG. 10 and FIG. 11 are diagrammatic views showing basic actions for various inter-system handover scenarios.

FIG. 10 shows a typical sequence of basic actions involved when a user equipment unit (UE) using a dedicated physical channel (e.g., the UE in state Cell_DCH) performs a handover from a UTRAN system to a GSM in the manner of the scenario of FIG. 3D. In FIG. 10, the "network" refers to the UTRAN network. While it should be understood that the sequence of FIG. 10 particularly concerns actions involved in handover from a first UTRAN frequency to a GSM cell, actions for exploring the feasibility of handover from the first UTRAN frequency to the second UTRAN frequency can be conducted in parallel.

As action 10-1, the network has ordered the user equipment unit (UE) to perform intra-frequency measurements. Like in the FIG. 8 scenario, the user equipment unit (UE) is using events 1A, 1B, 1C (explained above) for updating the active set. Action 10-2 shows that the user equipment unit (UE) has also been ordered to use a specified inter-frequency triggering event 2x (e.g., one of the triggering events 2a, 2b, 2c described above) for prompting a potential inter-system handover determination. That is, the user equipment unit (UE) is required to report when the UTRAN quality estimate for currently used UTRAN frequency becomes worse than a predefined absolute threshold (e.g., the threshold "Q_search_for_GSM").

When the inter-frequency triggering event 2x actually occurs (the currently used UTRAN frequency falling below the absolute threshold), such occurrence is reported by the user equipment unit (UE) to the network as shown by action 10-3 in FIG. 10. Then, as reflected by action 10-4, the network employs a physical channel reconfiguration message to direct the user equipment unit (UE) to start using a compressed mode to allow for inter-frequency measurements. The compressed mode has been previously described with reference to FIG. 9.

Once the compressed mode is begun, as illustrated by the message of action 10-5 the network orders the user equipment unit (UE) to perform inter-system measurements and to send a measurement report when an inter-system triggering event 3x occurs. The inter-system triggering event 3x is defined to occur when both (1) the estimated quality for currently used UTRAN frequency is below a specified threshold (e.g., the threshold "Q_search_for_GSM") and (2) the best GSM cell has a GSM carrier Radio Signal Strength Indication (RSSI) above an acceptable GSM RSSI threshold (e.g., the threshold "Q_accept_GSM").

When inter-system triggering event 3x actually occurs, the user equipment unit (UE) sends a measurement report (as action 10-6), which also serves to confirm that inter-system triggering event 3x has occurred. The measurement report of action 10-6 can optionally also include other information, such as (for example) the Base Transceiver Station Identity Code, Base Station Identifier Code (BSIC) confirmation status, and an observed time difference to GSM cell (the observed time difference being information from the user equipment unit (UE) indicating at what timing the GSM cell BCCH channel was found in relation to one of the UMTS cell's timing). Then, in response, as action 10-7, the network initiates an inter-system handover. If the inter-system handover is successfully performed the resources in UTRAN for the old frequency are released and the connection is continued using the GSM cell.

Hysteresis protection is provided for inter-system handovers. For example, for the FIG. 11 scenario, the hysteresis protection for going back from the GSM system to the URAN system is at least the difference in the two thresholds described above in the FIG. 11 scenario, e.g., at least the difference [(Q_accept_GSM)-(Q_search_for_UTRAN)]. Both thresholds expressed as GSM RXLEV values measured on the same GSM cell. RXLEV is the name of the information element which carries the received signal strength indicator (RSSI) in the measurement reports. The only difference is that measurement samples are typically obtained more often while camping on the GSM cell. In a similar way, the for the FIG. 10 scenario, the hysteresis protection for going back from the UTRAN system to the GSM system is at least the difference in the two thresholds described above in the FIG. 10 scenario, e.g., at least the difference [(Q_accept_UTRAN)-(Q_search_for_GSM)]. Both thresholds are expressed as UTRAN UTRAN quality estimates, e.g., Ec/N0 measured on the same UTRAN cell(s). The only difference is that measurement samples are typically obtained more often while camping on the UTRAN system.

Figure 12:
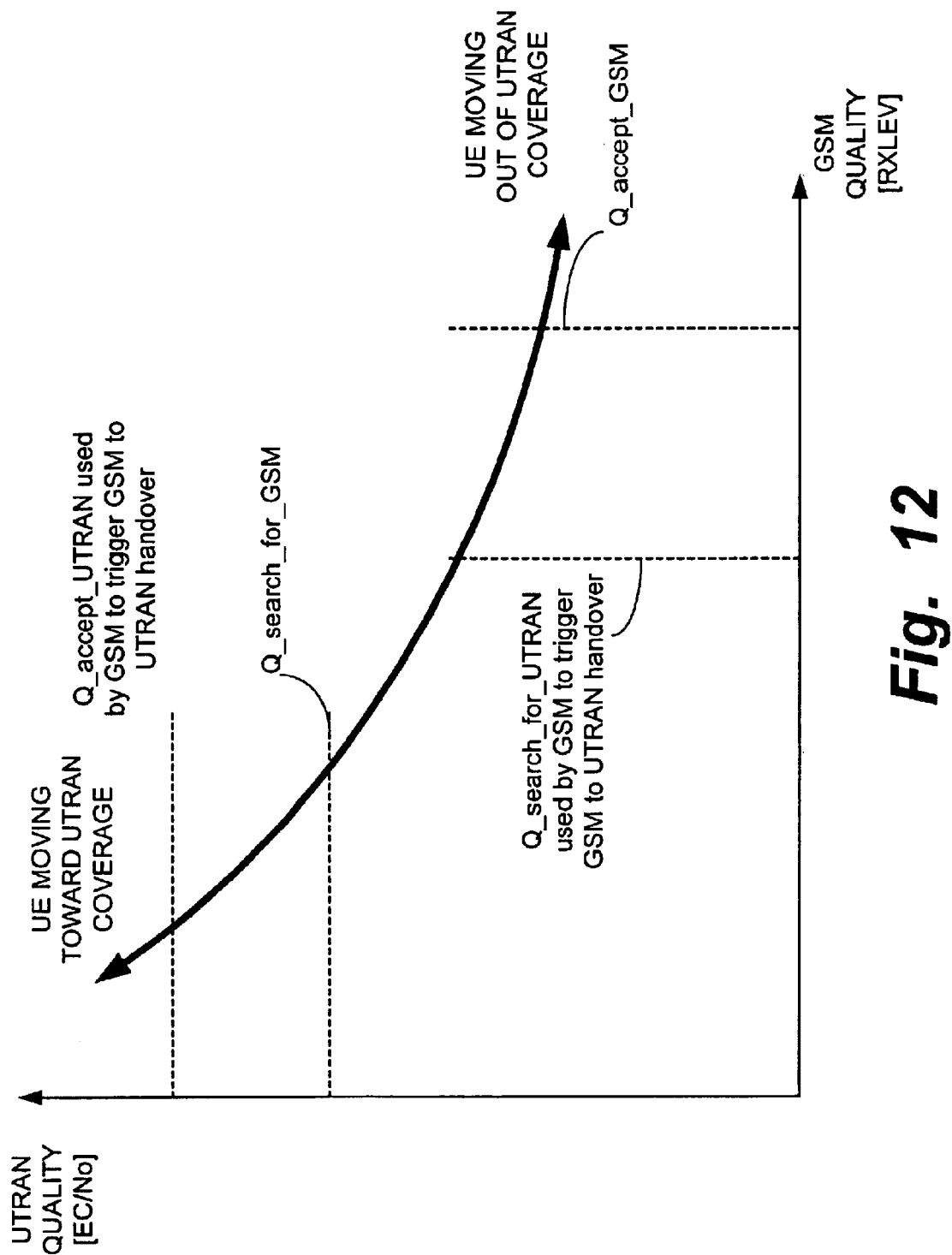
FIG. 12 is a graph showing threshold settings for a coverage limited case in which a first system does not completely overlap the coverage of a second system.
Figure 13:
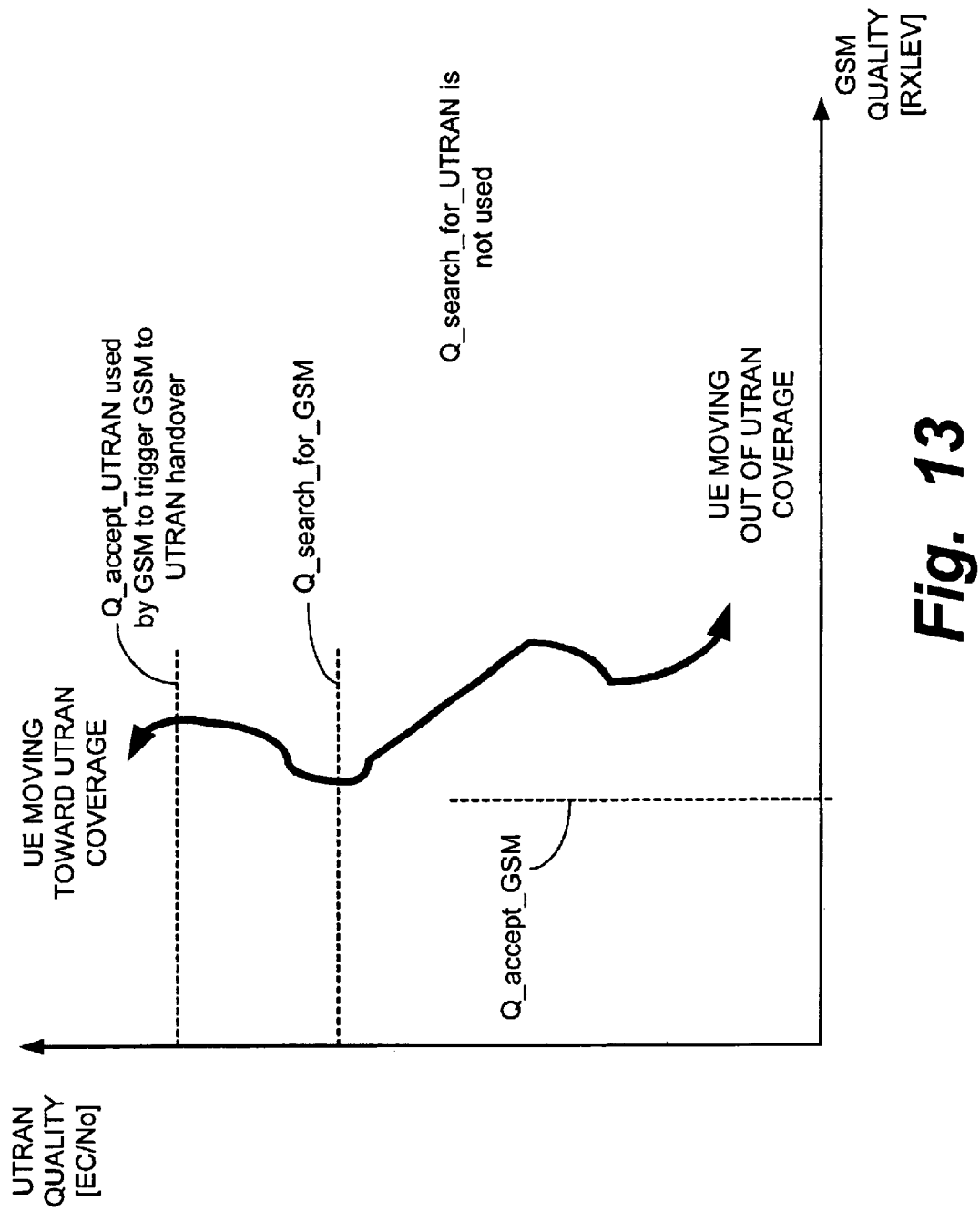
FIG. 13 is a graph showing threshold settings for a coverage limited case in which a first system does completely overlap the coverage of a second system.

The property of the above-provided threshold definitions is assumed to enable the hysteresis protection to be consistent and stable for different user equipment unit (UE) implementations that allow the operator to use a relative small hysteresis. Small hysteresis reduces the required coverage overlap between the systems. Small required coverage overlaps between UTRAN and GSM systems enhance the ability to get as large UTRAN coverage as possible without an increased risk of call drops due to failed inter-system handovers. The reduced hysteresis requirements also allow the GSM system to be offloaded by the UTRAN system in a larger area as compared to the case when large hysteresis is needed. FIG. 12 is a graph showing threshold settings for a coverage limited case in which a first system (e.g., GSM system) does not completely overlap the coverage of a second system (e.g., UTRAN system). FIG. 13, on the other hand, is a graph showing threshold settings for a coverage limited case in which the first system (e.g., GSM system) does completely overlap the coverage of the second system (e.g., UTRAN system).

Figure 14:
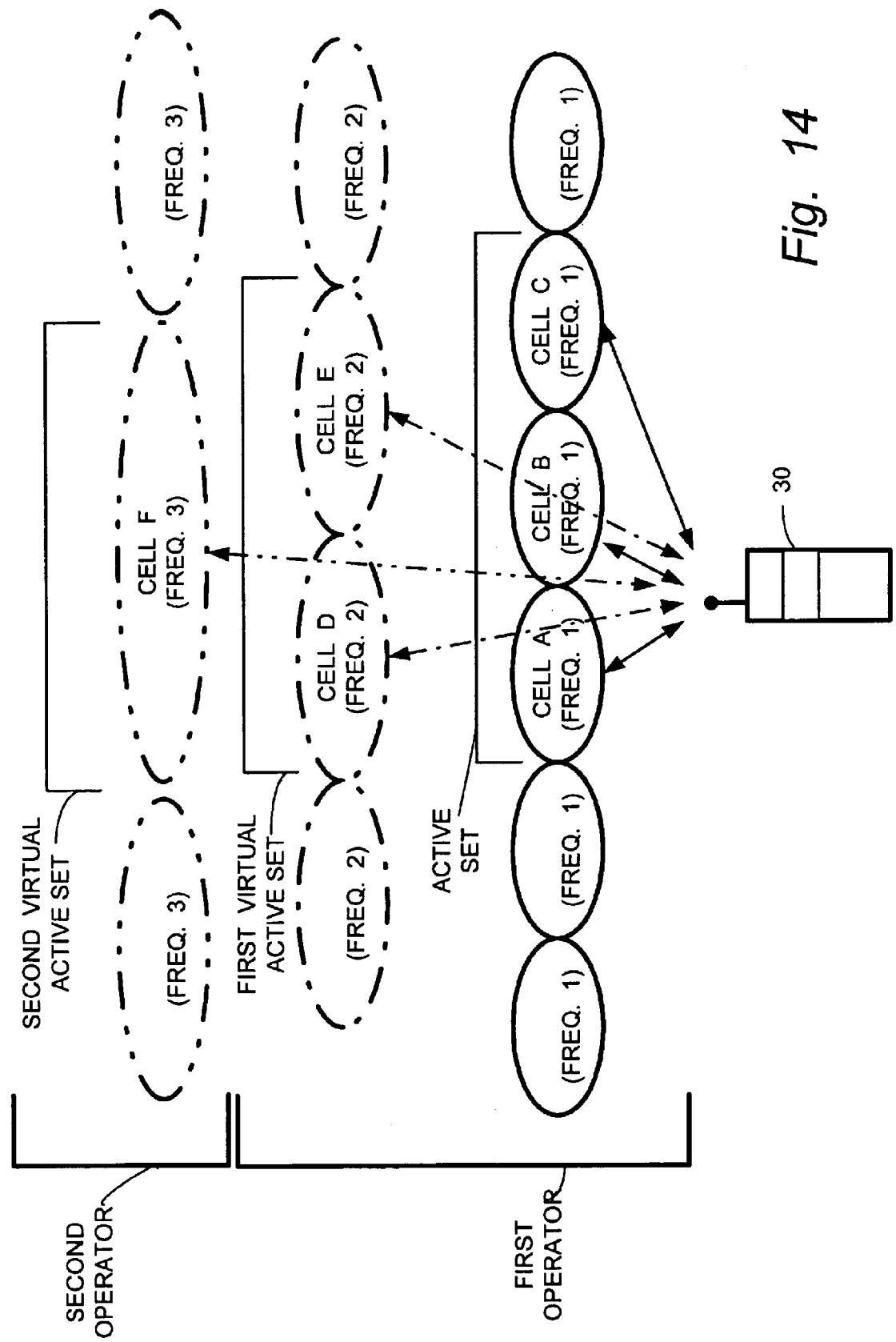
FIG. 14 is a diagrammatic view showing the use of an active set and virtual active sets for the purpose of performing a handover from one operator (e.g., a first network company) to another operator. (e.g., another network company).

As illustrated in FIG. 14, the principles of the present invention also apply to inter-system handover between different operators (e.g., different UTRAN operators), since different operators in the same area will have different frequencies.

The inter-system handover techniques of the present invention, as typified by the foregoing scenarios, provide numerous advantages, including the following. For example, the network can use events that arc suitable for controlling the start and stop of inter-system measurements. The Radio Signal Strength Indication (RSSI) measurements on a GSM cell can use the same mapping and range as specified in GSM 5.08: "Digital Cellular Telecommunication System (Phase 2+); Radio Subsystem Link Control".

The techniques of the invention harmonize with Idle mode inter-system cell reselection. That is, the same cell boarders are obtained for Idle mode cell reselection and for intersystem handover. The significance of this is that the cell chosen at the call setup is also the cell to be in according to the inter-system handover evaluation, i.e., the probability for an intermediate handover after call setup is low.

It is also possible to reconfigure the compressed mode while measurements dependent on the compressed mode are on-going. In accordance one aspect of the invention, indications are provided in measurement reports if conditions for measurement are not fulfilled (e.g., the compressed mode is turned off). The network also has the capability of indicating that a specific measurement has precedence with regards to the limited measurement time provided by the compressed mode.

As explained above, advantageously the user equipment unit (UE) sends inter-system measurement results with an indication whether the measured GSM cell frequency identity [Base Transceiver Station Identity Code, Base Station Identification Code (BSIC)] has been confirmed once or not. The network has the option to request a single or periodic reconfirmation of the Base Transceiver Station Identity Code, Base Station Identification Code (BSIC) of a measured GSM cell. Further, the network has the option to request that a user equipment unit (UE) measure and report on the same measured object and quantity in order to get appropriate hysteresis.

The typical case for usage of a "virtual active set" at inter-system handover is for the inter-system handover performed from GSM to UTRAN. The virtual active set allows the system to be prepared to use the cells indicated in the virtual active set as the active set to start with after the handover for this particular user equipment unit (UE). The usage of the virtual active set when going from UTRAN to GSM is to be able to compare the quality expected from other frequencies as compared to the quality on the current frequency but also as compared to the quality expected from GSM.

It should also be understood that in some situations the system may have a choice of performing an inter-frequency handover or an inter-system handover.

The user equipment unit (UE) can take into consideration the quality estimate of the active set for inter-system measurement triggering.

While various examples above have been provided with respect to a FDD mode of operation, it should be understood that principles of the invention are also applicable to handover from the TDD mode of operation to the FDD mode of operation, or handover from any system, e.g. GSM/GPRS to the FDD mode of operation.

As explained above, in the present invention the network advantageously provides the UE with a "virtual active set" on a non-used frequency. The virtual active set allows all of the events for intra frequency measurements to be reused for reporting inter frequency measurements and at the same time support the maintenance of a virtual active set on other frequencies than the currently used. This supports the network in establishing communication to a UE using an optimal active set as fast as possible after Inter-frequency handover is performed.

In some instances the present invention may result in a difference that the measurement accuracy will typically be less and maybe also a difference in the size of the "virtual active set" for other frequencies.

While the invention has been described in connection with what is presently considered to be most practical and preferred embodiment, it is to be understood that the invention is not to be limited to the disclosed embodiment, but on the contrary, is intended to cover various modifications and equivalent arrangements.

What is claimed is:

1. A user equipment unit which, while communicating with a telecommunications network using one of a cell or a current active set of base stations on a fist frequency, maintains a virtual active set of plural base stations on a second frequency and, while communicating with the telecommunications network using one of the cell or the current active set of base stations on the first frequency, performs measurements respecting signals on the second frequency for the respective plural base stations of the virtual active set, whereby the user equipment unit can switch to the virtual active set of plural base stations upon performance of an inter-frequency handover, wherein when a determination is made that an inter-frequency handover should be performed, the user equipment unit can switch to the virtual active set of plural base stations without making measurements respecting the signals on the second frequency after the determination and before using the virtual active set of plural base stations as a new active set.

2. The apparatus of claim 1, wherein the measurements made at the user equipment unit is triggered either periodically, immediately, or in response to a predetermined event.

3. The apparatus of claim 1, wherein in response to a measurement trigger criteria, the user equipment unit performs and reports inter-frequency measurements for the second frequency.

4. The apparatus of claim 3, wherein the measurement trigger criteria which causes the user equipment unit to perform and report inter-frequency measurements for the second frequency is the same criteria which is employed to cause the user equipment unit to perform and report intra-frequency measurements for the first frequency.

5. The apparatus of claim 3, wherein the measurement trigger criteria is one of being periodic, immediate, or in response to a predetermined event.

6. The apparatus of claim 1, wherein the signal for which the user equipment unit performs the measurement is a physical control channel on the second frequency.

7. The apparatus of claim 1, wherein the cells which belong to the virtual active set on the second frequency are cells which would be considered in the active set on the second frequency if the user equipment unit were to use the second frequency for active traffic.

8. A method of operating a user equipment unit which communicates with a telecommunications system, the method comprising tie user equipment unit:

while using one of a cell or a current active set of base stations on a first frequency, both
(1) maintaining a virtual active set of plural base stations on a second frequency; and
(2) performing measurements respecting signals on the second frequency for the respective plural base stations of the virtual active set;

when a determination is made that an inter-frequency handover should be performed, switching to the virtual active set of plural base stations without making measurements respecting the signals on the second frequency after the determination and before using the virtual active set of plural base stations as a new active set.

9. The method of claim 8, further comprising triggering the measurements made at the user equipment unit either periodically, immediately, or in response to a predetermined event.

10. The method of claim 8, further comprising the user equipment unit performing and reporting inter-frequency measurements for the second frequency in response to a measurement trigger criteria.

11. The method of claim 10, wherein the measurement trigger criteria which causes the user equipment unit to perform and report inter-frequency measurements for the second frequency is the same criteria which is employed to cause the user equipment unit to perform and report intra-frequency measurements for the first frequency.

12. The method of claim 10, wherein the measurement trigger criteria is one of being periodic, immediate, or in response to a predetermined event.

13. The method of claim 8, further comprising the network providing at least one member of the virtual active set of base stations on the second frequency in a virtual active set update procedure.

14. The method of claim 8, further comprising the user equipment unit receiving from the network an authorization message that allows the user equipment unit to update autonomously the virtual active set of base stations.

15. The method of claim 14, wherein the authorization message includes one of an event or a parameter that can trigger the update of the virtual active set of base stations without the user equipment unit first having to send a measurement report to the network.

16. The method of claim 8, wherein the signal for which the user equipment unit performs the measurement is a physical control channel on the second frequency.

17. The method of claim 8, wherein the cells which belong to the virtual active set on the second frequency are cells which would be considered in the active set on the second frequency if the user equipment unit were to use the second frequency for active traffic.

18. A method of operating a telecommunications network which communicates with a user equipment unit, the user equipment unit, while using one of a cell or a current active set of base stations on a first frequency, both (1) maintaining a virtual active set of plural base stations on a second frequency; and (2) performing measurements respecting signals on the second frequency for the respective plural base stations of the virtual active set; the method comprising when a determination is made that an inter-frequency handover should be performed, switching to the virtual active set of plural base stations without making measurements respecting the signals on the second frequency after the determination and before using the virtual active set of plural base stations as a new active set.

19. The method of claim 18, further comprising the network providing, information regarding the virtual active set of base stations on the second frequency in a measurement control message.

20. The method of claim 19, further comprising including the measurement control message in a DCCH control channel.

21. The method of claim 19, further comprising including in the measurement control message further one of a measurement parameter to be measured and a predetermined measurement event which triggers a measurement.

22. The method of claim 18, further comprising: maintaining the virtual active set of base stations on the second frequency by a second operator which differs from a first operator which maintains the current active set of base stations on the first frequency.

23. The method of claim 18, wherein the virtual active set of base stations on the second frequency comprises a second network system which differs from a first network system provided on the first frequency.

24. The method of claim 23, wherein the second network system is universal mobile telecommunications (UMS) and the first network system is a system having soft intra-frequency handover.

25. The method of claim 23, wherein the second network system is a Global System for Mobile (GSM) system and the first network system is universal mobile telecommunications (UMTS).

26. The method of claim 18, further comprising using a frequency quality estimate to determine when to switch to the virtual active set of base stations.

27. The method of claim 26, wherein the frequency quality estimate is provided by the equation:

$$Q_{carrier_j} = 10 \cdot \text{Log} M_{carrier_j} = 10 \cdot \text{Log}\left(W_j \cdot \left(\sum_{i=1}^{N_{Aj}} M_{i_j}\right) + (1 - W_j) \cdot M_{Best_j}\right)$$

wherein:

$Q_{frequency\ j}$ is the estimated quality of the active set on frequency j;

$M_{frequency\ j}$ is the estimated quality of the active set on frequency j.

$M_i$ is a measurement result of cell i in the active set.

$N_A$ is the number of cells in the active set;

$M_{Best}$ is the measurement result of the strongest cell in the active set;

W is a parameter with the value range 1–0 sent from the network to the user equipment unit;

wherein when W=0 only the measurement results from the best cell on frequency j is used; and when W=1 only the sum of the measurement results from the cells in the active set is used.

28. The method of claim 26, wherein the frequency quality estimate is based on two factors: (1) a carrier Radio Signal Strength Indication (RSSI); and (2) whether the Base Transceiver Station Identity Code/Base Station Identifier Code (BSIC) has been confirmed or not.

29. The method of claim 26, wherein the network compares the frequency quality estimate to at least one threshold to determine when to switch to the virtual active set of base stations.

30. The method of claim 29, wherein the at least one threshold is chosen to provide hysteresis protection.

31. A user equipment unit which, while communicating with a telecommunications network using one of a cell or a current active set of base stations which operate on a first frequency, performs measurements respecting signals of a second frequency from each of plural base stations which operate on the second frequency, and maintains as a virtual active set plural base stations which operate on the second frequency and which satisfy network-specified criteria, so that when an inter-frequency handover is required the virtual active set can essentially immediately be utilized as the active set for the user equipment whereby the user equipment unit can be in radio communication with each of the plural base stations in the virtual active set; wherein the virtual active set being essentially immediately utilized involves the user equipment unit switching to the virtual active set of plural base stations without making measurements respecting the signals on the second frequency after a determination that an inter-frequency handover should be performed and before using the virtual active set of plural base stations as a new active set.

32. The apparatus of claim 31, wherein the measurements made at the user equipment unit is triggered either periodically, immediately, or in response to a predetermined event.

33. The apparatus of claim 31, wherein in response to a measurement trigger criteria, the user equipment unit performs and reports inter-frequency measurements for the second frequency.

34. The apparatus of claim 33, wherein the measurement trigger criteria which causes the user equipment unit to perform and report inter-frequency measurements for the second frequency is the same criteria which is employed to cause the user equipment unit to perform and report intra-frequency measurements for the first frequency.

35. The apparatus of claim 31, wherein the measurement trigger criteria is one of being periodic, immediate, or in response to a predetermined event.

36. The apparatus of claim 31, wherein when the network issues an inter-frequency handover command to the user equipment unit, the user equipment unit switches to the virtual active set of base stations.

37. The apparatus of claim 31, wherein the network provides information regarding the virtual active set of base stations on the second frequency in a measurement control message.

38. The apparatus of claim 37, wherein the measurement control message is included in a DCCH control channel.

39. The apparatus of claim 37, wherein the measurement control message further includes one of a measurement parameter to be measured and a predetermined measurement event which triggers a measurement.

40. The apparatus of claim 31, wherein the network provides at least one member of the virtual active set of base stations on the second frequency in a virtual active set update procedure.

41. The apparatus of claim 31, wherein the user equipment unit receives from the network an authorization message that allows the user equipment unit to autonomously update the virtual active set of base stations.

42. The apparatus of claim 41, wherein the authorization message specifies one of an event or a parameter that can trigger the update of the virtual active set of base stations without the user equipment unit first having to send a measurement report to the network.

43. The network of claim 31, wherein the virtual active set of base stations on the second frequency is maintained by a second operator which differs from a first operator which maintains the current active set of base stations on the first frequency.

44. The apparatus of claim 31, wherein the virtual active set of base stations on the second frequency comprises a second network system which differs from a first network system provided on the first frequency.

45. The apparatus of claim 44, wherein the second network system is universal mobile telecommunications (UMTS) and the first network system is a Global System for Mobile (GSM) system.

46. The apparatus of claim 44, wherein the second network system is a system having soft intra-frequency handover and the first network system is universal mobile telecommunications (UMTS).

47. The apparatus of claim 31, wherein the network utilizes a frequency quality estimate to determine when to switch to the virtual active set of base stations.

48. The apparatus of claim 47, wherein the frequency quality estimate $Q_{carrier\ j}$ of the active set on frequency j is a function of the following parameters:

$$W_j, \sum_{i=1}^{N_{Aj}} M_{ij}, M_{Best\ j}$$

wherein:

$M_i$ is a measurement result of cell i in the active set;

$N_A$ is the number of cells in the active set;

$M_{Best}$ is the measurement result of the strongest cell in the active set;

W is a parameter sent from the network to the user equipment unit.

49. The apparatus of claim 47, wherein the frequency quality estimate is based on two factors: (1) a carrier Radio Signal Strength Indication (RSSI); and (2) whether the Base Transceiver Station Identity Code/Base Station Identifier Code (BSIC) has been confined or not.

50. The apparatus of claim 47, wherein the network compares the frequency quality estimate to at least one threshold to determine when to switch to the virtual active set of base stations.

51. The apparatus of claim 50, wherein the at least one threshold is chosen to provide hysteresis protection.

\* \* \* \* \*